(12) United States Patent
Hwang et al.

(10) Patent No.: US 11,997,047 B2
(45) Date of Patent: May 28, 2024

(54) METHOD AND DEVICE FOR DETERMINING PRIORITY OF HARQ FEEDBACK IN NR V2X

(71) Applicant: LG ELECTRONICS INC., Seoul (KR)

(72) Inventors: Daesung Hwang, Seoul (KR); Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/705,235

(22) Filed: Mar. 25, 2022

(65) Prior Publication Data

US 2022/0216975 A1 Jul. 7, 2022

Related U.S. Application Data

(63) Continuation of application No. PCT/KR2021/002059, filed on Feb. 18, 2021.

(Continued)

(30) Foreign Application Priority Data

Mar. 27, 2020 (KR) .................. 10-2020-0037816
May 12, 2020 (KR) .................. 10-2020-0056536

(51) Int. Cl.
*H04L 1/1812* (2023.01)
*H04L 5/00* (2006.01)
(Continued)

(52) U.S. Cl.
CPC .......... *H04L 5/0055* (2013.01); *H04L 1/1812* (2013.01); *H04W 72/21* (2023.01); *H04W 72/23* (2023.01)

(58) Field of Classification Search
CPC ..... H04L 5/055; H04L 1/1812; H04L 5/0055; H04L 5/0094; H04L 1/18; H04L 1/1854;
(Continued)

(56) References Cited

U.S. PATENT DOCUMENTS 10,912,108 B2 * 2/2021 Lee ................. H04W 72/23
2019/0174533 A1 6/2019 Lee et al.
(Continued)

FOREIGN PATENT DOCUMENTS

EP 4027732 7/2022

OTHER PUBLICATIONS

Ericsson, "Text proposal for TS 38.213 endorsed in [100e-NR-5G_V2X_NRSL-RA_Mode1-03]," 3GPP TSG-RAN WG1 Meeting #100, R1-2001414, Mar. 6, 2020, 4 pages.
(Continued)

*Primary Examiner* — Hanh N Nguyen
(74) *Attorney, Agent, or Firm* — LEE, HONG, DEGERMAN, KANG & WAIMEY

(57) ABSTRACT

Provided are a method for performing wireless communication by a first device, and a device for supporting the method. The method may comprise: receiving, from a base station, information related to a physical uplink control channel (PUCCH) resource for reporting hybrid automatic repeat request (HARQ) feedback information and information related to a configured grant (CG) resource for sidelink (SL); generating ACK information, based on no physical sidelink control channel (PSCCH) transmission by the first device on the CG resource in a single period; and determining a priority value of the ACK information, wherein the priority value of the ACK information is same as a largest priority value among at least one possible priority value related to the CG resource.

19 Claims, 26 Drawing Sheets

Related U.S. Application Data

(60) Provisional application No. 63/104,497, filed on Oct. 22, 2020, provisional application No. 62/991,551, filed on Mar. 18, 2020.

(51) Int. Cl.
*H04W 72/21* (2023.01)
*H04W 72/23* (2023.01)

(58) Field of Classification Search
CPC ... H04L 1/0018; H04L 5/0053; H04L 1/1822; H04L 1/1848; H04L 1/1861; H04L 1/1893; H04W 72/0413; H04W 72/042; H04W 52/325; H04W 52/146; H04W 52/281; H04W 72/14; H04W 72/0446; H04W 72/10; H04W 4/40; H04W 72/1242; H04W 72/1278; H04W 72/1268; H04W 74/0833; H04W 72/21; H04W 72/23; H04W 92/18; H04W 72/56; H04W 72/20; H04W 72/05
See application file for complete search history.

(56) References Cited

U.S. PATENT DOCUMENTS

| | | | | |
|---|---|---|---|---|
| 2020/0228248 A1* | 7/2020 | Islam | | H04L 1/1861 |
| 2021/0028891 A1* | 1/2021 | Zhou | | H04L 1/1819 |
| 2021/0029723 A1* | 1/2021 | Wu | | H04W 72/569 |
| 2021/0105126 A1* | 4/2021 | Yi | | H04L 1/1671 |
| 2021/0144755 A1* | 5/2021 | Ozturk | | H04W 74/0816 |
| 2021/0259042 A1* | 8/2021 | Ding | | H04W 76/28 |
| 2021/0321367 A1* | 10/2021 | Zhang | | H04W 72/10 |
| 2022/0312435 A1* | 9/2022 | Ye | | H04L 1/1854 |
| 2022/0312438 A1* | 9/2022 | Yi | | H04W 72/1263 |
| 2023/0046263 A1* | 2/2023 | Wong | | H04W 72/569 |
| 2023/0059550 A1* | 2/2023 | Yao | | H04L 1/1812 |

OTHER PUBLICATIONS

Ericsson, "Feature lead summary#4 on Resource allocation for NR sidelink Mode 1," 3GPP TSG-RAN WG1 Meeting #100, R1-2001367, Mar. 6, 2020, 42 pages.

CATT "Remaining issues on Mode 1 resource allocation in NR V2X," 3GPP TSG-RAN WG1 Meeting #100, R1-2000521, Mar. 6, 2020, 6 pages.

Oppo, "Remaining issues of mode 1 resource allocation for NR-V2X," 3GPP TSG-RAN WG1 #100 e-Meeting, R1-2000490, Mar. 6, 2020, 11 pages.

PCT International Application No. PCT/KR2021/002059, International Search Report dated May 20, 2021, 4 pages.

European Patent Office Application Serial No. 21772335.2, Search Report dated Oct. 12, 2022, 14 pages.

Nokia, Nokia Shanghai Bell, "Unresolved issues on SL and UL prioritization", R2-1913147, 3GPP TSG-RAN WG2 Meeting #107bis, Oct. 2019, 4 pages.

* cited by examiner

FIG. 4
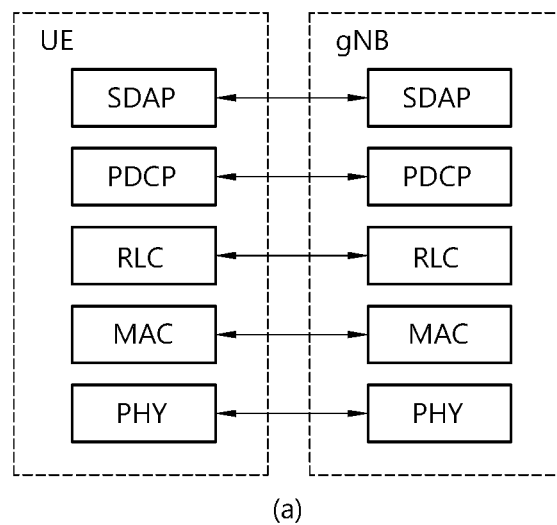
(a)
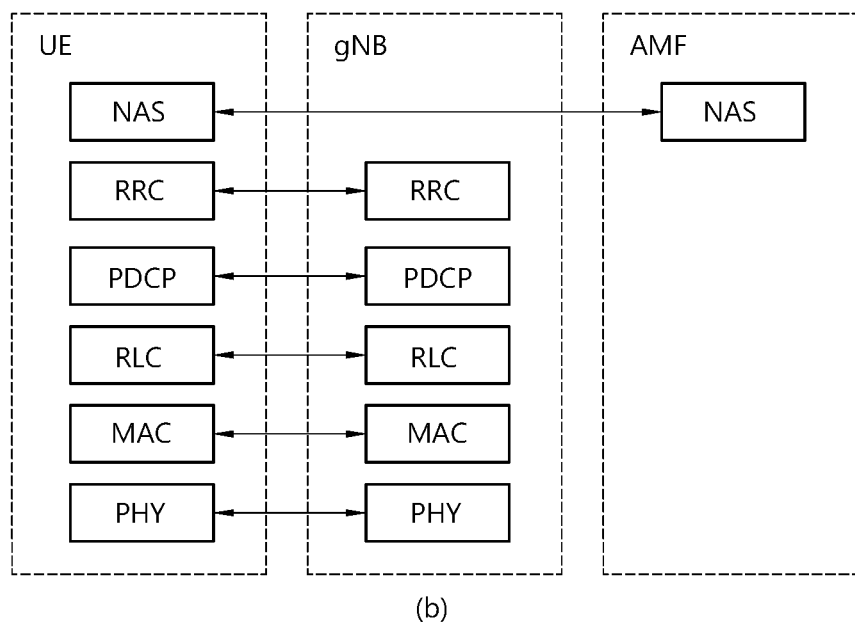
(b)

FIG. 8
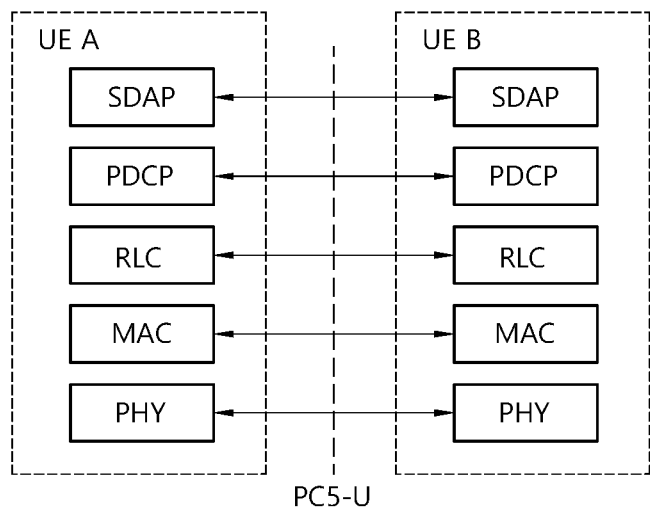
(a)
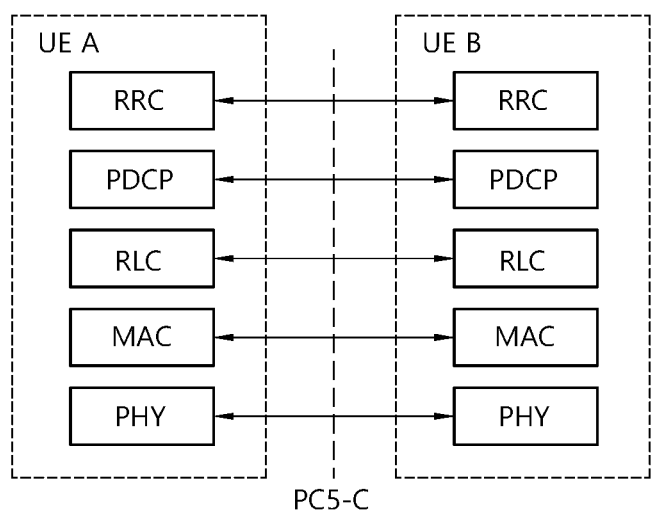
(b)

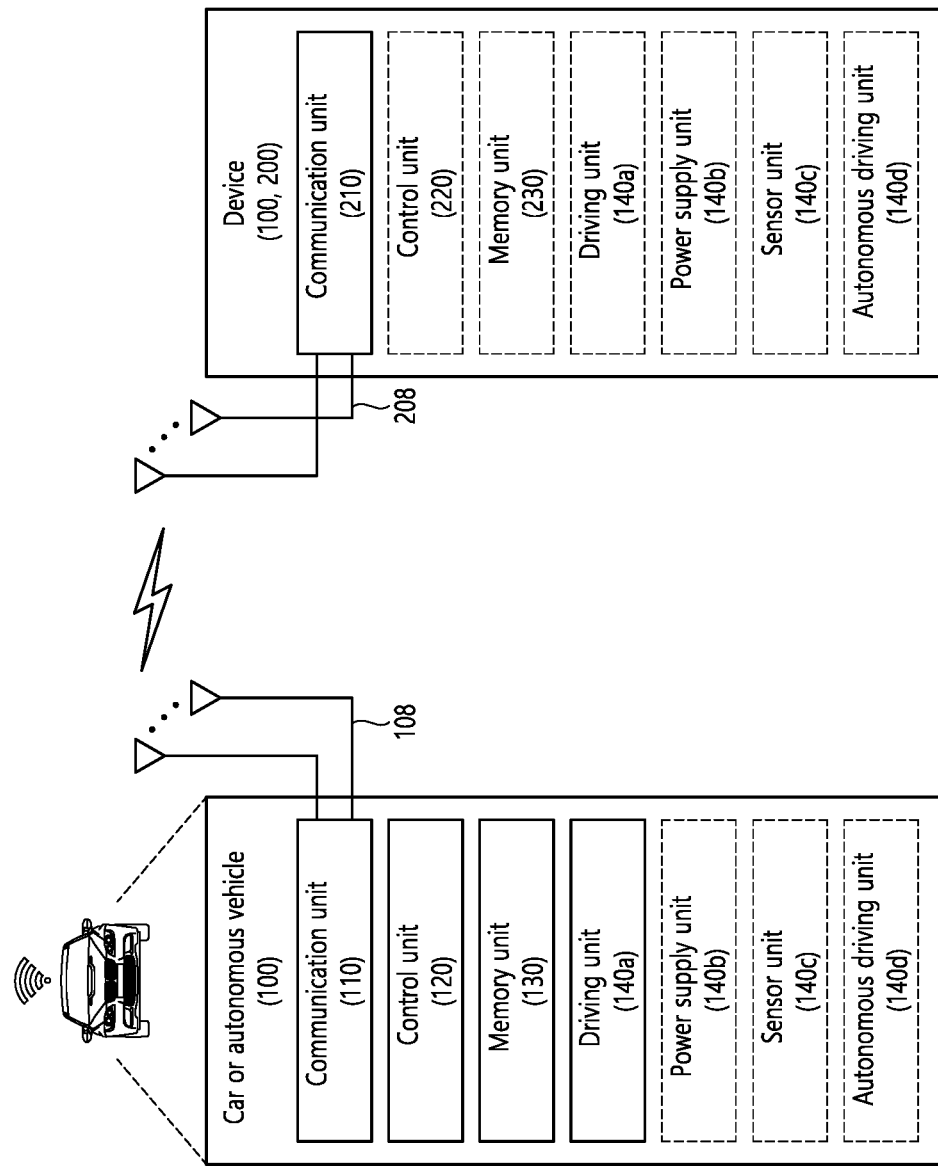

METHOD AND DEVICE FOR DETERMINING PRIORITY OF HARQ FEEDBACK IN NR V2X

CROSS-REFERENCE TO RELATED APPLICATIONS

This application is a continuation of International Application No. PCT/KR2021/002059, filed on Feb. 18, 2021, which claims the benefit of earlier filing date and right of priority to Korean Patent Application Nos. 10-2020-0037816 filed on Mar. 27, 2020, and 10-2020-0056536 filed on May 12, 2020, and also claims the benefit of U.S. Provisional Application Nos. 62/991,551 filed on Mar. 18, 2020, and 63/104,497, filed on Oct. 22, 2020, the contents of all of which are hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, a UE may report SL HARQ feedback information to a base station through a PUCCH even if SL transmission is not performed. In this case, the UE needs to determine a priority of PUCCH transmission.

Technical Solutions

In one embodiment, a method for performing, by a first device, wireless communication is provided. The method may comprise: receiving, from a base station, information related to a physical uplink control channel (PUCCH) resource for reporting hybrid automatic repeat request (HARQ) feedback information and information related to a configured grant (CG) resource for sidelink (SL); generating ACK information, based on no physical sidelink control channel (PSCCH) transmission by the first device on the CG resource in a single period; and determining a priority value of the ACK information, wherein the priority value of the ACK information is same as a largest priority value among at least one possible priority value related to the CG resource.

In one embodiment, a first device configured to perform wireless communication is provided. The first device may comprise: one or more memories storing instructions; one or more transceivers; and one or more processors connected to the one or more memories and the one or more transceivers. The one or more processors may execute the instructions to: receive, from a base station, information related to a physical uplink control channel (PUCCH) resource for reporting hybrid automatic repeat request (HARQ) feedback information and information related to a configured grant (CG) resource for sidelink (SL); generate ACK information, based on no physical sidelink control channel (PSCCH) transmission by the first device on the CG resource in a single period; and determine a priority value of the ACK information, wherein the priority value of the ACK information is same as a largest priority value among at least one possible priority value related to the CG resource.

Effects of the Disclosure

The user equipment (UE) may efficiently perform SL communication.

BRIEF DESCRIPTION OF THE DRAWINGS

FIG. 4 shows a radio protocol architecture, based on an embodiment of the present disclosure.

FIG. 8 shows a radio protocol architecture for a SL communication, based on an embodiment of the present disclosure.

FIG. 26 shows a vehicle or an autonomous vehicle, based on an embodiment of the present disclosure.

DESCRIPTION OF EXEMPLARY EMBODIMENTS

Figure 1:
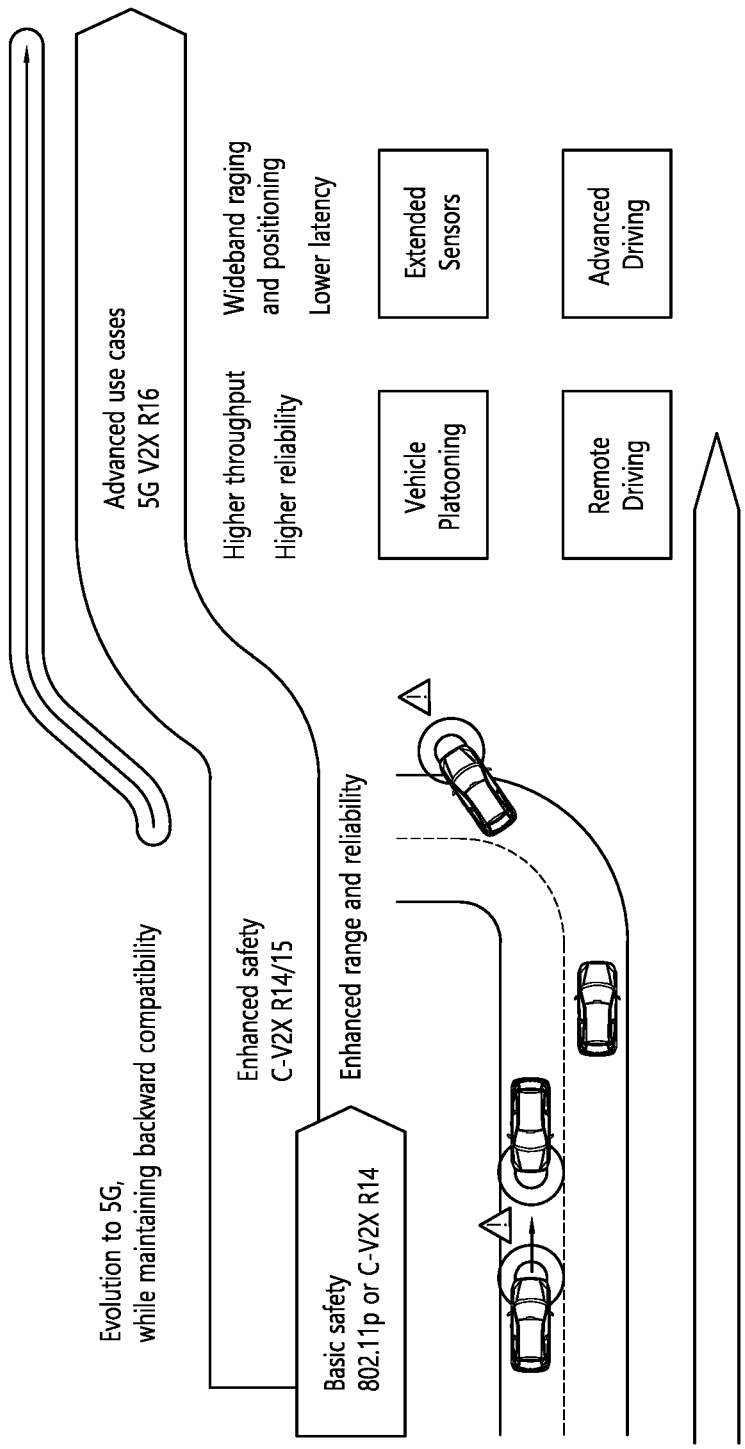
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
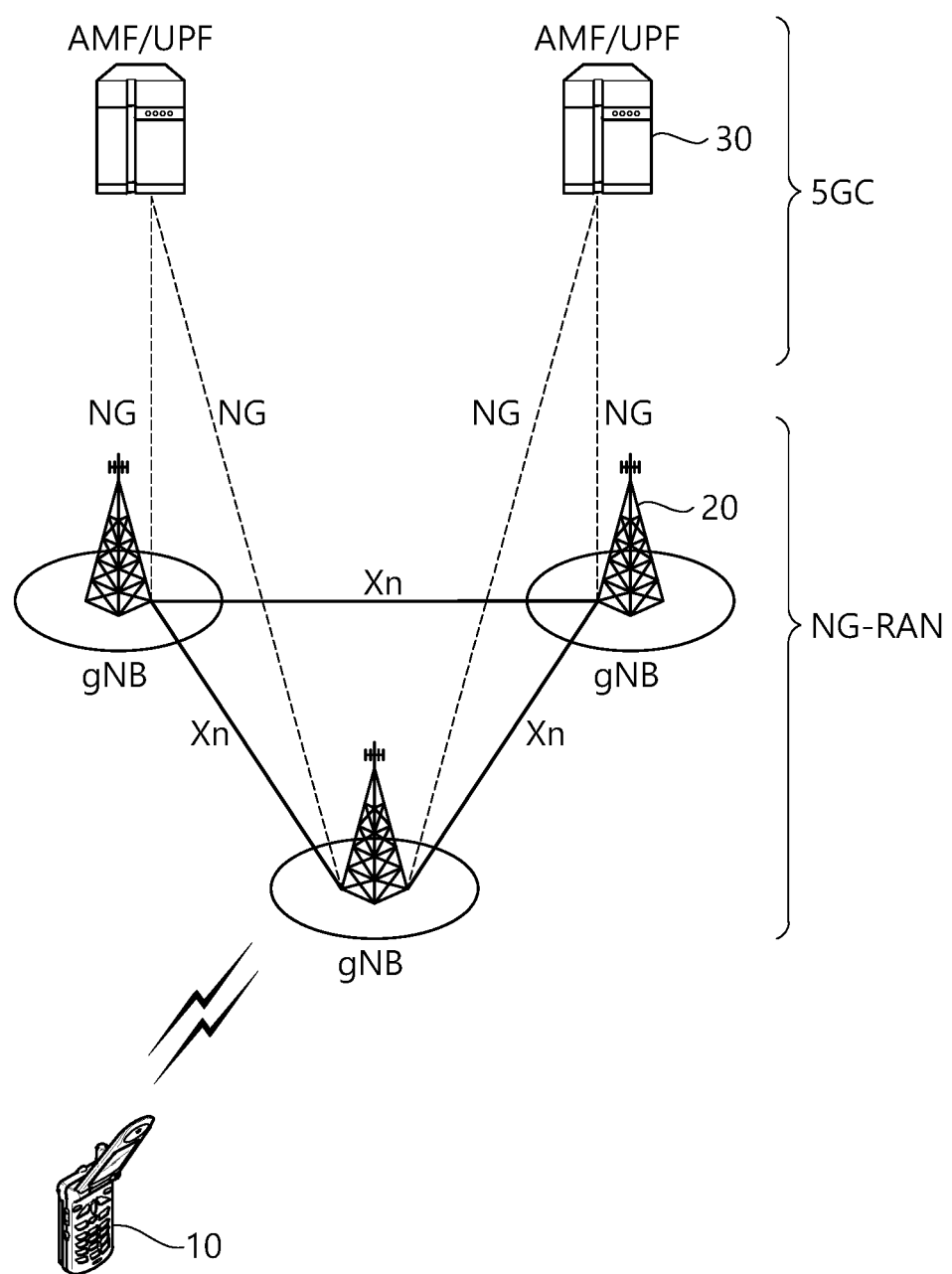
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
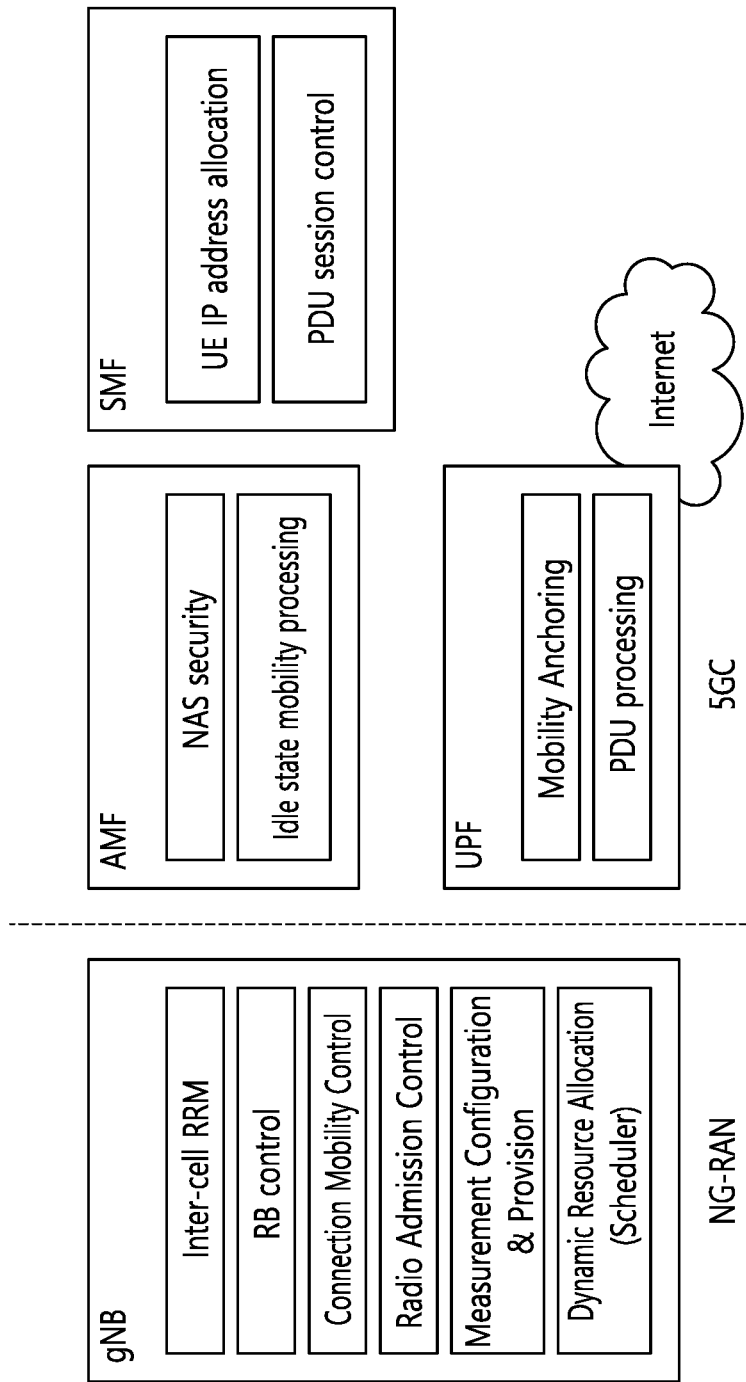
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. AUPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, based on an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
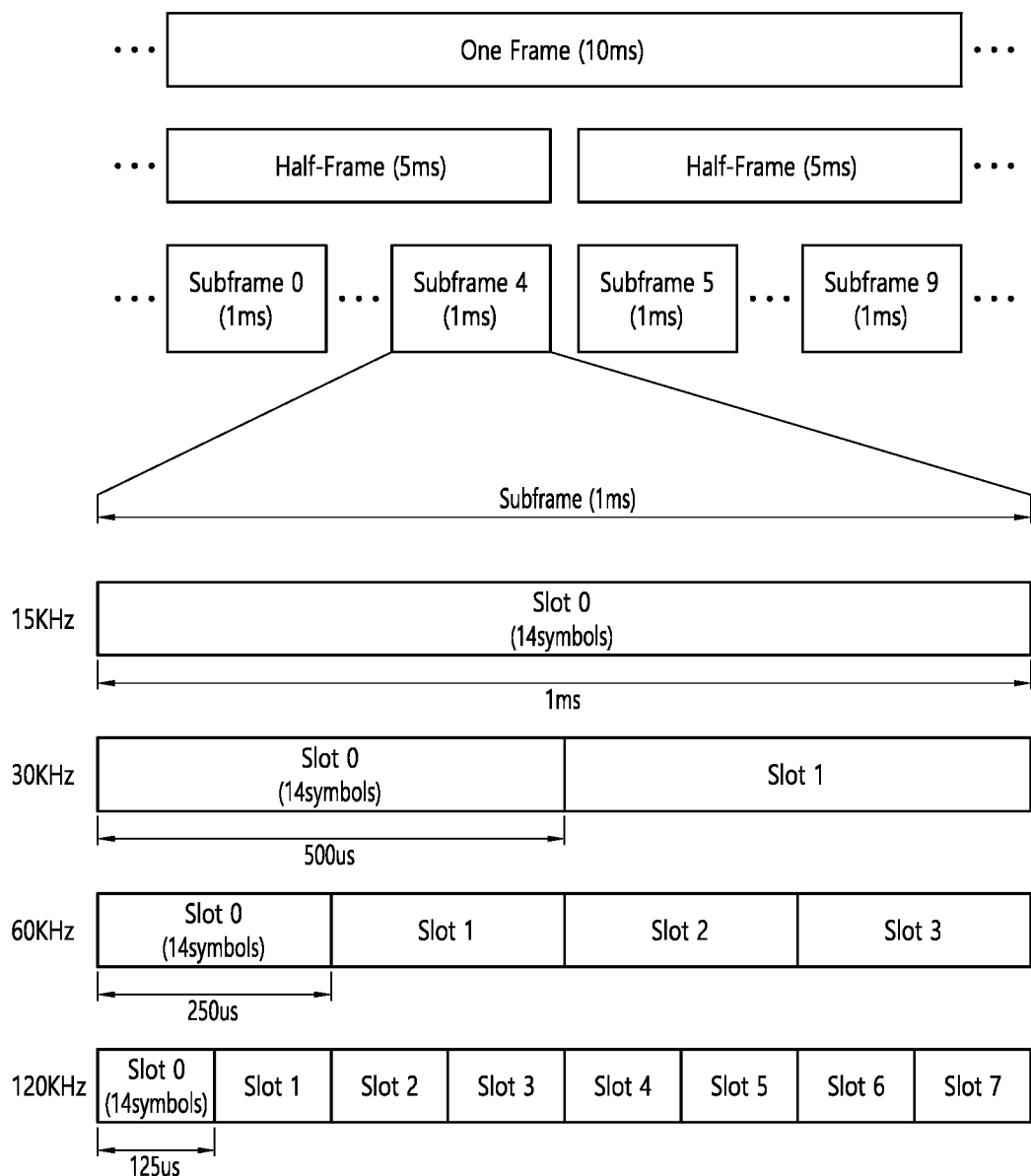
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$) a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15 * $2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15 * $2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 6:
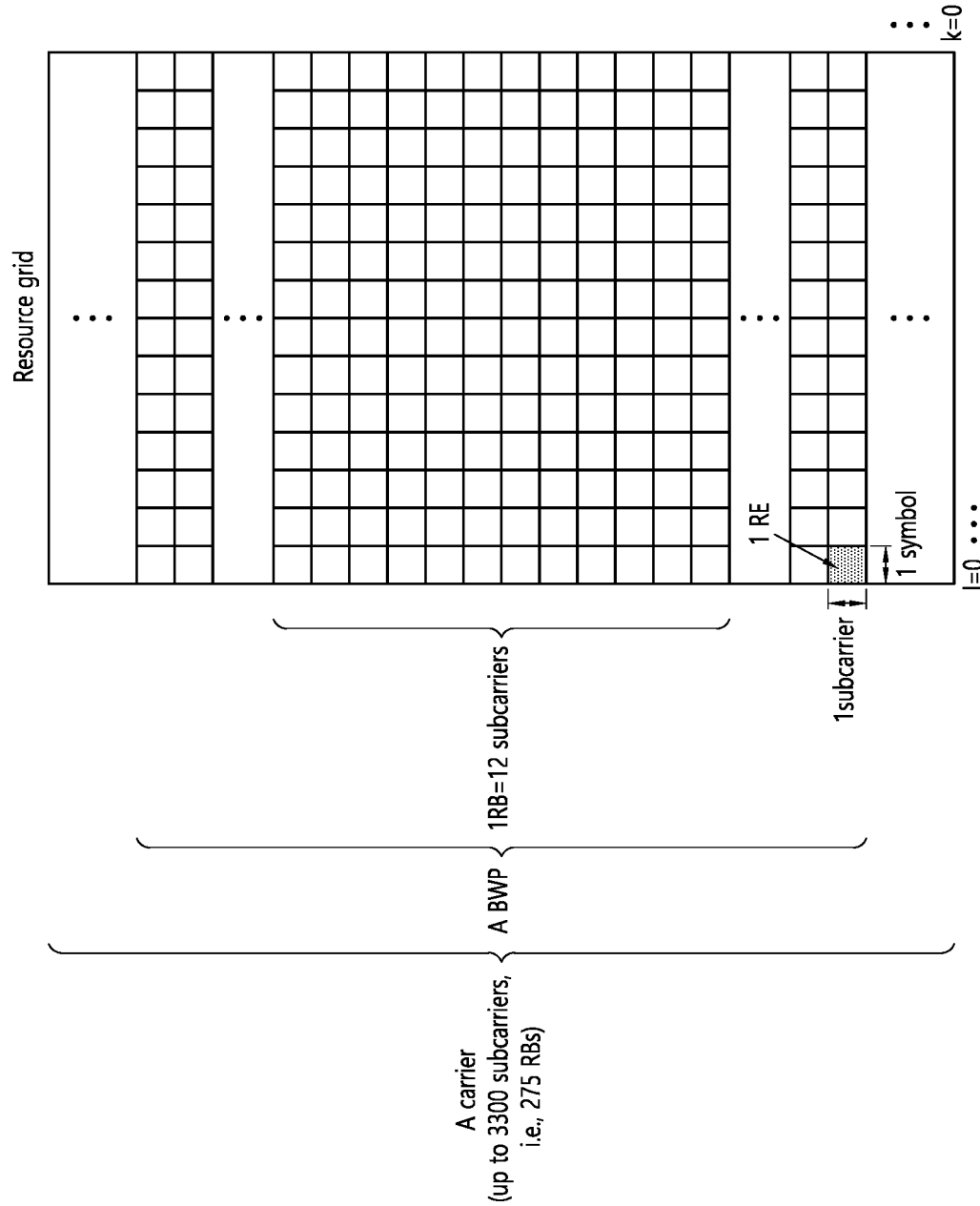
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
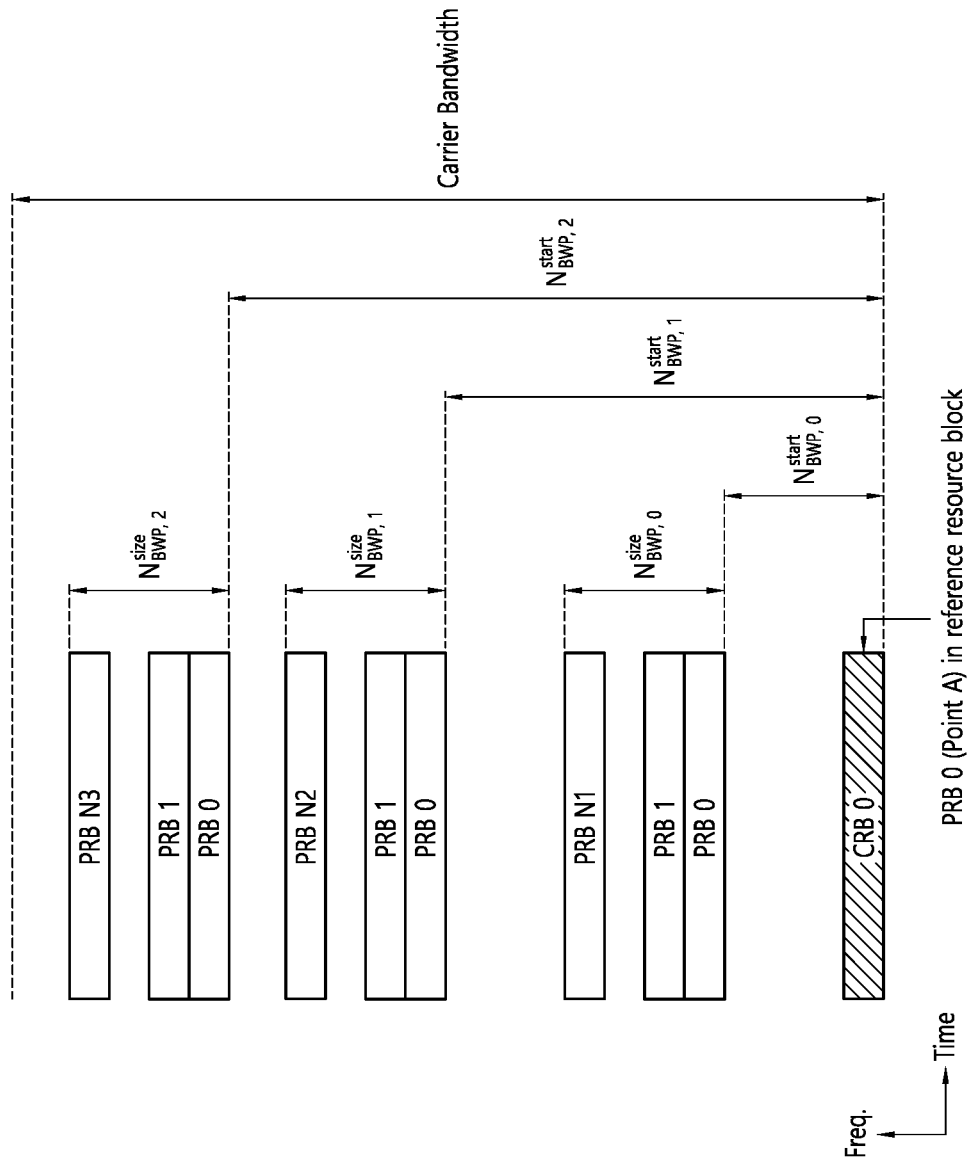
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, based on an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
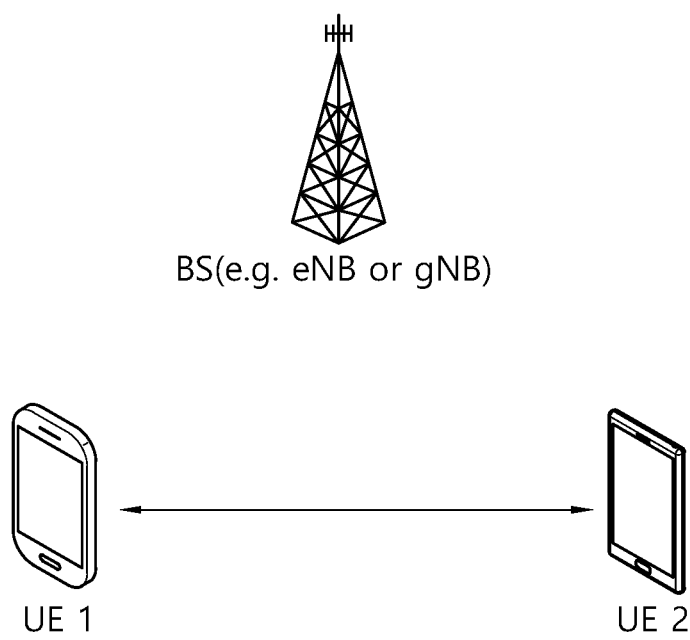
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit a SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
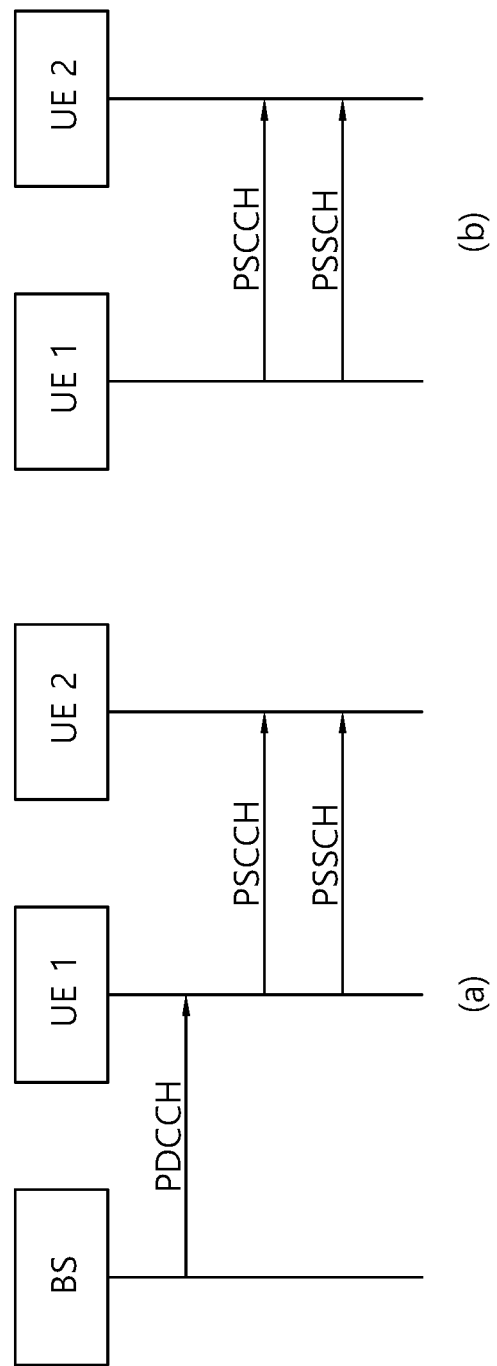
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule a SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine a SL transmission resource within a SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
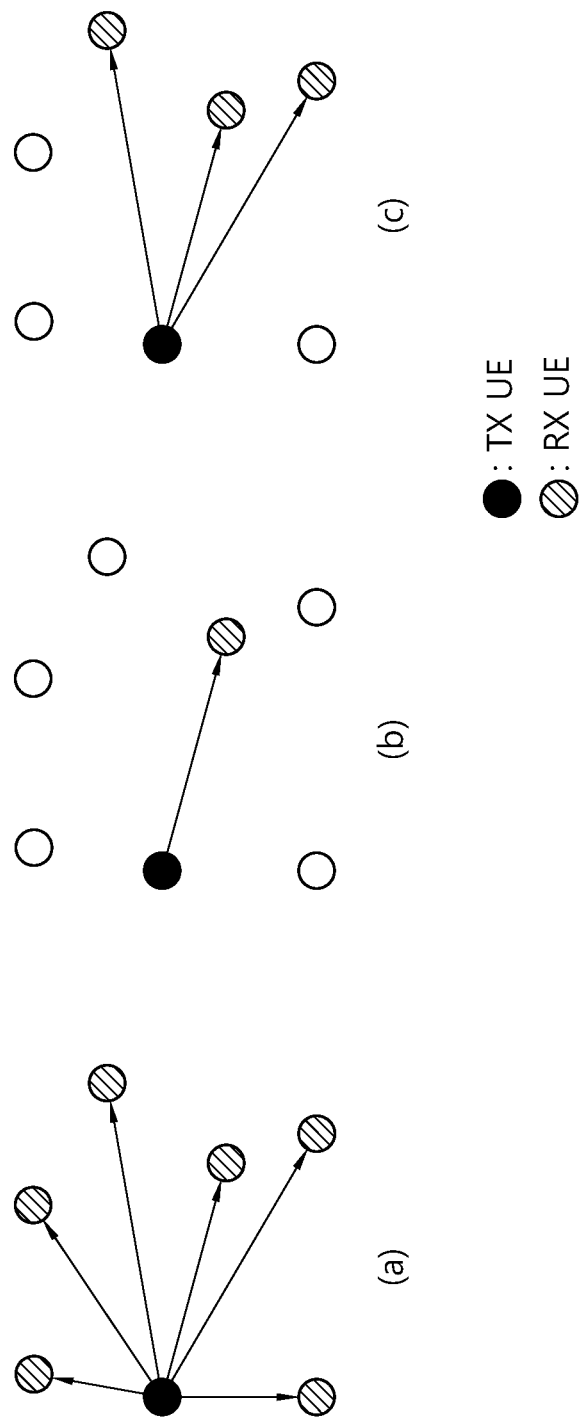
FIG. 11 shows three cast types, based on an embodiment of the present disclosure.

FIG. 11 shows three cast types, based on an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Figure 12:
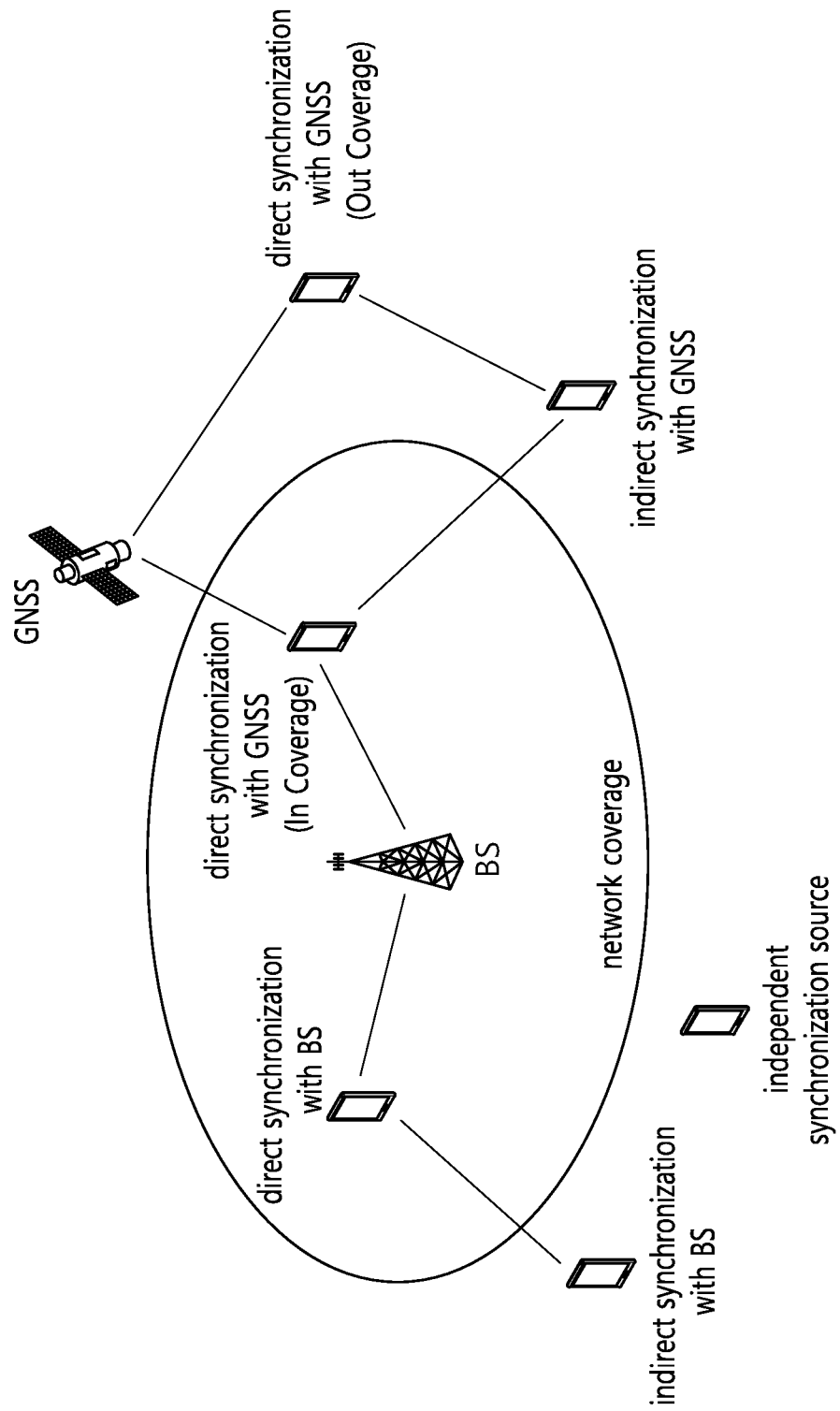
FIG. 12 shows a synchronization source or synchronization reference of V2X, based on an embodiment of the present disclosure.

FIG. 12 shows a synchronization source or synchronization reference of V2X, based on an embodiment of the present disclosure. The embodiment of FIG. 12 may be combined with various embodiments of the present disclosure.

Referring to FIG. 12, in V2X, a UE may be directly synchronized with a global navigation satellite system (GNSS), or may be indirectly synchronized with the GNSS through a UE (inside network coverage or outside network coverage) directly synchronized with the GNSS. If the GNSS is configured as the synchronization source, the UE may calculate a DFN and a subframe number by using a coordinated universal time (UTC) and a (pre-)configured direct frame number (DFN) offset.

Alternatively, the UE may be directly synchronized with a BS, or may be synchronized with another UE which is time/frequency-synchronized with the BS. For example, the BS may be an eNB or a gNB. For example, if the UE is inside the network coverage, the UE may receive synchronization information provided by the BS, and may be directly synchronized with the BS. Thereafter, the UE may provide the synchronization information to adjacent another UE. If BS timing is configured based on synchronization, for synchronization and downlink measurement, the UE may be dependent on a cell related to a corresponding frequency (when it is inside the cell coverage at the frequency), or a primary cell or a serving cell (when it is outside the cell coverage at the frequency).

The BS (e.g., serving cell) may provide a synchronization configuration for a carrier used in V2X or SL communication. In this case, the UE may conform to the synchronization configuration received from the BS. If the UE fails to detect any cell in a carrier used in the V2X or SL communication and fails to receive the synchronization configuration from the serving cell, the UE may conform to a pre-configured synchronization configuration.

Alternatively, the UE may be synchronized with another UE which fails to obtain synchronization information directly or indirectly from the BS or the GNSS. A synchronization source or preference may be pre-configured to the UE. Alternatively, the synchronization source and preference may be configured through a control message provided by the BS.

A SL synchronization source may be associated/related with a synchronization priority. For example, a relation between the synchronization source and the synchronization priority may be defined as shown in Table 5 or Table 6. Table 5 or Table 6 are for exemplary purposes only, and the relation between the synchronization source and the synchronization priority may be defined in various forms.

TABLE 5

| Priority level | GNSS-based synchronization | eNB/gNB-based synchronization |
| --- | --- | --- |
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | All other UEs | GNSS |
| P4 | N/A | All UEs directly synchronized with GNSS |
| P5 | N/A | All UEs indirectly synchronized with GNSS |
| P6 | N/A | All other UEs |

TABLE 6

| Priority level | GNSS-based synchronization | eNB/gNB-based synchronization |
| --- | --- | --- |
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | BS | GNSS |
| P4 | All UEs directly synchronized with BS | All UEs directly synchronized with GNSS |
| P5 | All UEs indirectly synchronized with BS | All UEs indirectly synchronized with GNSS |
| P6 | Remaining UE(s) having low priority | Remaining UE(s) having low priority |

In Table 5 or Table 6, P0 may denote a highest priority, and P6 may denote a lowest priority. In Table 5 or Table 6, the BS may include at least one of a gNB and an eNB.

Whether to use GNSS-based synchronization or BS-based synchronization may be (pre-)configured. In a single-carrier operation, the UE may derive transmission timing of the UE from an available synchronization reference having the highest priority.

Hereinafter, a hybrid automatic repeat request (HARQ) procedure will be described.

An error compensation scheme is used to secure communication reliability. Examples of the error compensation scheme may include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

For example, when the SL HARQ feedback is enabled for groupcast, the receiving UE may determine whether to transmit the HARQ feedback to the transmitting UE based on a transmission-reception (TX-RX) distance and/or RSRP.

For example, in the groupcast option 1, in case of the TX-RX distance-based HARQ feedback, if the TX-RX distance is less than or equal to a communication range requirement, the receiving UE may transmit HARQ feedback for the PSSCH to the transmitting UE. Otherwise, if the TX-RX distance is greater than the communication range requirement, the receiving UE may not transmit the HARQ feedback for the PSSCH to the transmitting UE. For example, the transmitting UE may inform the receiving UE of a location of the transmitting UE through SCI related to the PSSCH. For example, the SCI related to the PSSCH may be second SCI. For example, the receiving UE may estimate or obtain the TX-RX distance based on a location of the receiving UE and the location of the transmitting UE. For example, the receiving UE may decode the SCI related to the PSSCH and thus may know the communication range requirement used in the PSSCH.

For example, in case of the resource allocation mode 1, a time (offset) between the PSFCH and the PSSCH may be configured or pre-configured. In case of unicast and groupcast, if retransmission is necessary on SL, this may be indicated to a BS by an in-coverage UE which uses the PUCCH. The transmitting UE may transmit an indication to a serving BS of the transmitting UE in a form of scheduling request (SR)/buffer status report (BSR), not a form of HARQ ACK/NACK. In addition, even if the BS does not receive the indication, the BS may schedule an SL retransmission resource to the UE. For example, in case of the resource allocation mode 2, a time (offset) between the PSFCH and the PSSCH may be configured or pre-configured.

For example, from a perspective of UE transmission in a carrier, TDM between the PSCCH/PSSCH and the PSFCH may be allowed for a PSFCH format for SL in a slot. For example, a sequence-based PSFCH format having a single symbol may be supported. Herein, the single symbol may not an AGC duration. For example, the sequence-based PSFCH format may be applied to unicast and groupcast.

For example, in a slot related to a resource pool, a PSFCH resource may be configured periodically as N slot durations, or may be pre-configured. For example, N may be configured as one or more values greater than or equal to 1. For example, N may be 1, 2, or 4. For example, HARQ feedback for transmission in a specific resource pool may be transmitted only through a PSFCH on the specific resource pool.

For example, if the transmitting UE transmits the PSSCH to the receiving UE across a slot #X to a slot #N, the receiving UE may transmit HARQ feedback for the PSSCH to the transmitting UE in a slot #(N+A). For example, the slot #(N+A) may include a PSFCH resource. Herein, for example, A may be a smallest integer greater than or equal to K. For example, K may be the number of logical slots. In this case, K may be the number of slots in a resource pool. Alternatively, for example, K may be the number of physical slots. In this case, K may be the number of slots inside or outside the resource pool.

For example, if the receiving UE transmits HARQ feedback on a PSFCH resource in response to one PSSCH transmitted by the transmitting UE to the receiving UE, the receiving UE may determine a frequency domain and/or code domain of the PSFCH resource based on an implicit mechanism in a configured resource pool. For example, the receiving UE may determine the frequency domain and/or code domain of the PSFCH resource, based on at least one of a slot index related to PSCCH/PSSCH/PSFCH, a sub-channel related to PSCCH/PSSCH, and/or an identifier for identifying each receiving UE in a group for HARQ feedback based on the groupcast option 2. Additionally/alternatively, for example, the receiving UE may determine the frequency domain and/or code domain of the PSFCH resource, based on at least one of SL RSRP, SINR, L1 source ID, and/or location information.

For example, if HARQ feedback transmission through the PSFCH of the UE and HARQ feedback reception through the PSFCH overlap, the UE may select any one of HARQ feedback transmission through the PSFCH and HARQ feedback reception through the PSFCH based on a priority rule. For example, the priority rule may be based on at least priority indication of the related PSCCH/PSSCH.

For example, if HARQ feedback transmission of a UE through a PSFCH for a plurality of UEs overlaps, the UE may select specific HARQ feedback transmission based on the priority rule. For example, the priority rule may be based on at least priority indication of the related PSCCH/PSSCH.

Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present disclosure, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present disclosure, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/BS.

Figure 13:
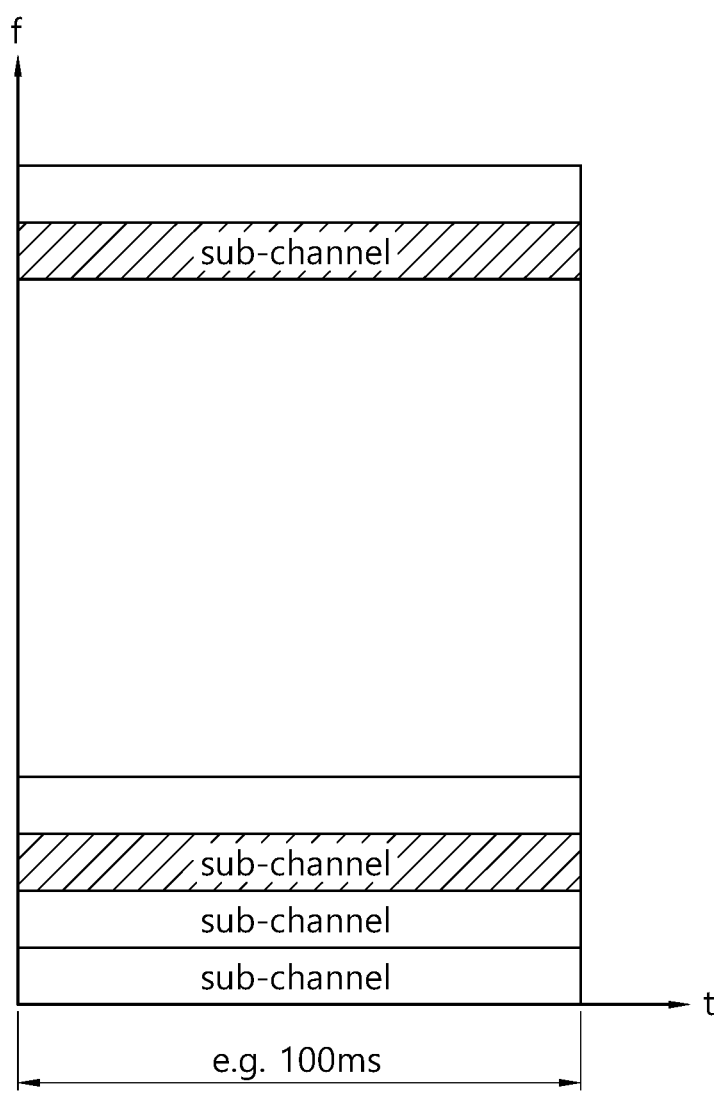
FIG. 13 shows a resource unit for CBR measurement, based on an embodiment of the present disclosure.

FIG. 13 shows a resource unit for CBR measurement, based on an embodiment of the present disclosure. The embodiment of FIG. 13 may be combined with various embodiments of the present disclosure.

Referring to FIG. 13, CBR may denote the number of sub-channels in which a measurement result value of a received signal strength indicator (RSSI) has a value greater than or equal to a pre-configured threshold as a result of measuring the RSSI by a UE on a sub-channel basis for a specific period (e.g., 100 ms). Alternatively, the CBR may denote a ratio of sub-channels having a value greater than or equal to a pre-configured threshold among sub-channels for a specific duration. For example, in the embodiment of FIG. 13, if it is assumed that a hatched sub-channel is a sub-channel having a value greater than or equal to a pre-configured threshold, the CBR may denote a ratio of the hatched sub-channels for a period of 100 ms. Additionally, the UE may report the CBR to the BS.

Further, congestion control considering a priority of traffic (e.g. packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (Modulation and Coding Scheme (MCS) coordination), or the like.

Meanwhile, in the next-generation system, direct communication may be performed between UEs through SL. As an example of a method for SL communication, a specific UE may receive a time-frequency resource and/or transmission method for SL transmission (e.g., modulation and coding scheme (MCS), the number of transmission layers, the number of codewords, code block group (CBG) information, HARQ process information, precoding matrix indicator (PMI) information, etc.) from a base station (through higher layer signaling and/or DCI indication), and the specific UE may transmit a PSCCH and a PSSCH to another UE based on the corresponding indication information. For example, the UE receiving the PSCCH/PSSCH may be a UE associated with the same serving cell as the UE transmitting the PSCCH/PSSCH. For example, the UE receiving the PSCCH/PSSCH may be a UE associated with a different serving cell than the UE transmitting the PSCCH/PSSCH. For example, the UE receiving the PSCCH/PSSCH may be a UE located out of coverage (i.e., out-of-coverage). As in the above method, in the embodiment of the present disclosure, performing SL transmission by the UE based on indication information from the base station may be referred to as SL transmission mode 1. In the SL transmission mode 1, even in the case of retransmission, communication between UEs may occur based on the indication of the base station. Even when another initial transmission starts, it may be favorable in terms of efficient resource management for SL transmission for the base station to be aware of the communication situation between UEs.

Figure 14:
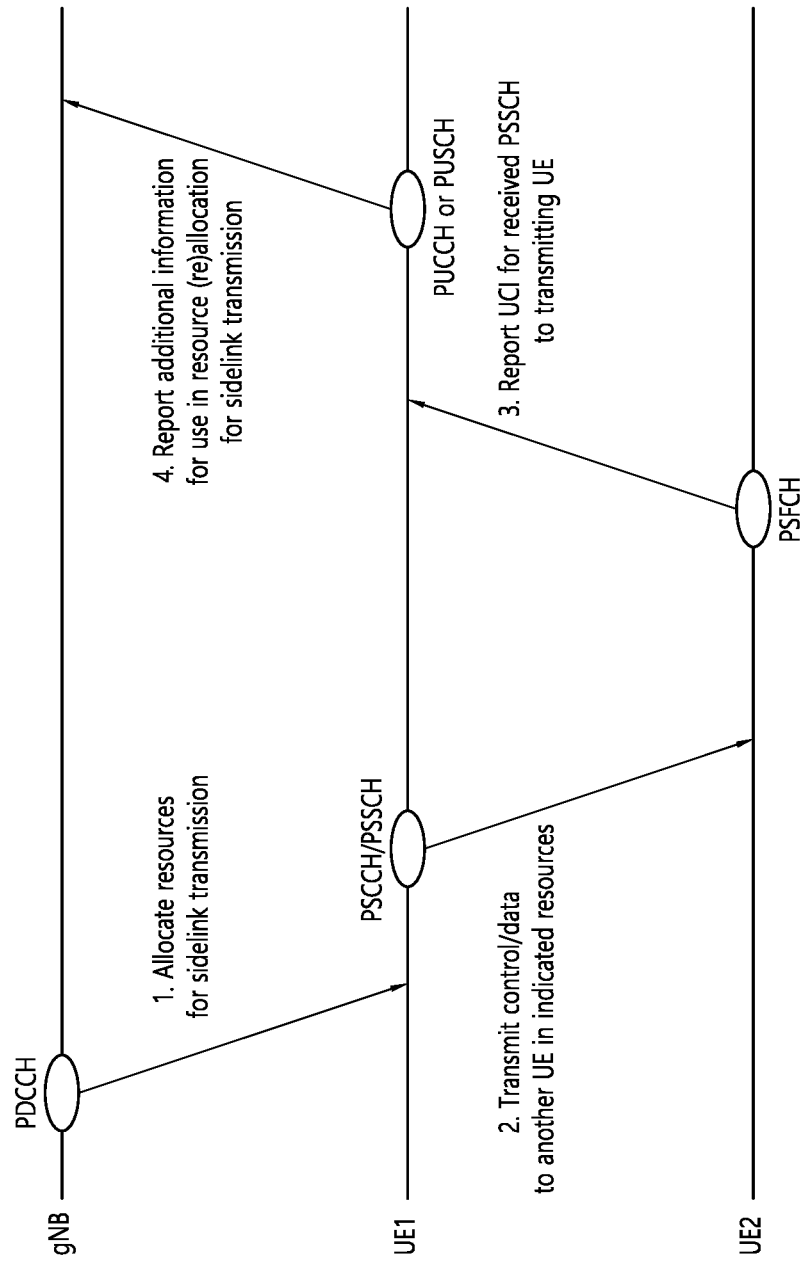
FIG. 14 shows a procedure for a UE to report uplink control information (UCI) to a base station in SL transmission mode 1, based on an embodiment of the present disclosure.

FIG. 14 shows a procedure for a UE to report uplink control information (UCI) to a base station in SL transmission mode 1, based on an embodiment of the present disclosure. The embodiment of FIG. 14 may be combined with various embodiments of the present disclosure.

For example, in terms of the base station, the communication situation between UEs (e.g., channel situation, traffic characteristics, PSCCH/PSSCH transmission scheme (e.g., transport block size (TBS), the number of transport layers, etc.) cannot be directly obtained. Therefore, the related information needs to be transmitted/reported to the base station by the UE associated with the corresponding serving cell. The amount of the information and the constitution of the information to be reported is actually utilized only if there is no ambiguity between the base station and the UE. If the amount of the information and the constitution of the information can be changed according to the UE-based selection, a method for avoiding the ambiguity may be required. For example, if the amount of HARQ-ACK feedback for SL transmission between UEs may be different depending on the selection of the UE (e.g., SCI format used), and if the UE transmits the corresponding HARQ-ACK feedback to the base station, a default assumption for the HARQ-ACK codebook in which the base station may assume regardless of the UE's selection may be required. Based on various embodiments of the present disclosure, a method for a UE to configure a UCI for SL transmission and a method for the UE to transmit the UCI to a base station are proposed. In the embodiment of the present disclosure, SL transmission mode 1 is assumed, but the technical idea of the present disclosure can be extended and applied to other SL transmission method. Furthermore, the technical idea of the present disclosure can be extended and applied even in a situation in which information on a communication situation between a general UE and a base station is transmitted/reported to another UE through SL.

Based on various embodiments of the present disclosure, a method for configuring a UCI for SL transmission to be reported by a UE to a base station and an apparatus supporting the same are proposed. In addition, a method for a specific UE that transmits the corresponding UCI and a subsequent procedure corresponding thereto are proposed. In addition, a method for selecting, by a specific UE, a time when the specific UE transmits the UCI for SL transmission to a base station, and a transmission container (e.g., PUCCH or PUSCH), and an apparatus supporting the same are proposed.

Figure 15:
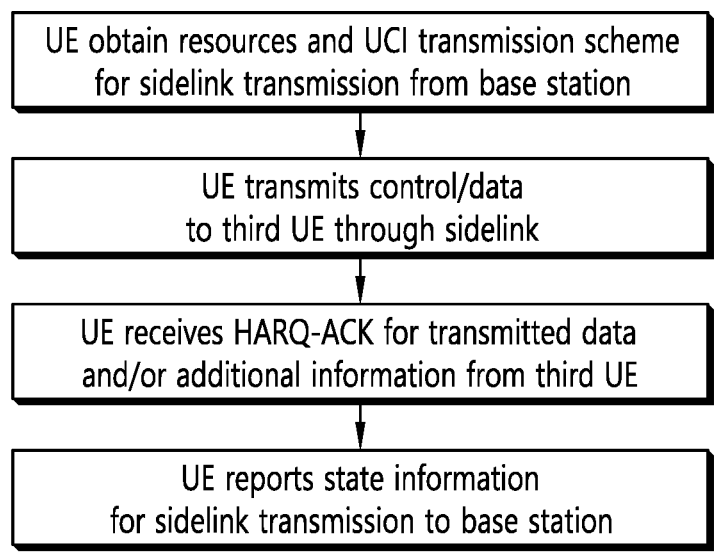
FIG. 15 shows a method for a UE to report information related to SL transmission to a base station, based on an embodiment of the present disclosure.

FIG. 15 shows a method for a UE to report information related to SL transmission to a base station, based on an embodiment of the present disclosure. The embodiment of FIG. 15 may be combined with various embodiments of the present disclosure.

1. UCI Transmission Procedure for SL Transmission

In SL transmission mode 1, a base station may be associated with at least one of UEs participating in SL transmission. That is, a specific UE may receive a PDCCH and a PDSCH from the base station, and on the contrary, the specific UE may transmit a PUSCH or a PUCCH to the base station. Another UE participating in the SL transmission may be (1) associated with the base station indicating resource information and/or a transmission scheme for SL transmission, (2) associated with another base station, or (3) in an out-of-coverage state in which no PDCCH/PDSCH is received from any base station. Basically, an entity responsible for UCI transmission/reporting for SL transmission may be a UE which has received a PDCCH including resource information and/or a transmission scheme for the SL transmission from the base station. In the above situation, the base station may efficiently (re)allocate resources for SL transmission based on the UCI reporting of the UE.

2. Method for Configuring a UCI for SL Transmission

Basically, the UCI for SL transmission to be reported by the UE to the base station may include (1) HARQ-ACK information for SL transmission or HARQ-ACK information for PSCCH/PSSCH transmission/reception, (2) channel/transmission quality information (e.g., CSI) between UEs participating in SL transmission, and/or (3) information related to a preferred or configurable configuration/parameter configured for SL transmission.

In an embodiment of the present disclosure, the following may be assumed for PSCCH/PSSCH/PFSCH transmission on SL, for the convenience of description. A capability for each transmission scheme may vary according to a carrier or service type corresponding to the SL. For example, TB-based transmission and HARQ-ACK feedback may be available for a specific carrier or service type. For example, CBG-based transmission and HARQ-ACK feedback may be available for another specific carrier or service type. For example, a MIMO operation (i.e., the maximum number of supported TBs) may be different for each carrier or service type.

3. UCI Transmission Method for SL Transmission

When the UE transmits UCI for SL transmission to the base station, it is necessary to align transmission positions between the UE and the base station, for transmission and reception without ambiguity. The following is more specific examples of setting a UCI transmission timing.

Alt 1: The base station may indicate a transmission timing (e.g., slot) of UCI for SL transmission to the UE. Specifically, for example, the indication information regarding the UCI transmission timing may be included in a PDCCH indicating resources for the SL transmission. For example, candidate values for the transmission timing may be pre-defined (e.g., 1, 2, 3, . . . , 8 slots). Alternatively, for example, the base station may configure the candidate values for the UE through higher layer signaling. For example, if there is a single candidate value, the UCI transmission timing may be determined according to the value. For example, the UE needs to determine the UCI transmission timing based on the UCI transmission time indication value. To this end, a reference point for applying the UCI transmission timing needs to be defined again. More specific examples of a method of defining a reference point and applying a transmission timing indication value are given below.

(1) Alt 1-1: The indication value for the UCI transmission timing may be an offset value between a slot in which a PDCCH is transmitted and a slot in which UCI is to be transmitted. In this method, the transmission timing of a PSFCH from a PSCCH/PSSCH may be limited according to the indication value for the UCI transmission timing indicated by the base station. However, the base station may still specify a correct UCI reporting position regardless of what happens on the SL. If different numerologies are applied to the PDCCH and a UCI transmission channel, the offset value may be based on the numerology of the UCI transmission channel, and the zero value of the offset (i.e., the reference point) may be the earliest (or last) of slots based on the numerology of the UCI transmission channel overlapped with PDCCH transmission slots.

(2) Alt 1-2: The indication value for the UCI transmission timing may be information regarding an offset between a slot transmitted in resources indicated by the PDCCH or a slot for transmitting the PSCCH or PSSCH included in the resources and the slot in which the UCI is transmitted. Since the UCI may be basically transmitted based on the result of the SL transmission, as a matter of fact, the UCI may not be transmitted earlier than the PSSCH. Therefore, in this case, it may be meaningful in that unnecessary offset values are excluded in advance. The slot in which the resources indicated by the base station are located and the slot for transmitting the PSSCH may be identical for the above method. If the numerology is different between the PSCCH or PSSCH and the UCI transmission channel, the offset value may be based on the numerology of the UCI transmission channel, and the zero value of the offset (i.e., the reference point) may be the last (or earliest) of slots based on the numerology of the UCI transmission channel overlapped with PSCCH or PSSCH transmission slots.

(3) Alt 1-3: The indication value for the UCI transmission timing may be offset information from a slot in which a PSFCH for a PSSCH transmitted on a resource indicated by a PDCCH including the corresponding indication value is transmitted to a slot in which the corresponding UCI is transmitted. Specifically, for example, the base station may indicate to the UE a slot offset or a timing difference between the PSSCH and the PSFCH (through higher layer signaling or DCI indication). For example, the slot offset or the timing difference between the PSSCH and the PSFCH may be predefined. Alternatively, for example, it may be a case in which the base station can successfully receive/decode the PSCCH transmitted by the UE. In other cases, since the base station cannot know the timing at which the UCI will be transmitted, the present method cannot be regarded as feasible. If the numerology between the PSFCH and the UCI transmission channel is different, the corresponding offset value may be a value based on the numerology for the UCI transmission channel, and the zero value of the offset (i.e., the reference point) may be the last slot (or earliest slot) among slots based on the numerology for the UCI transmission channel overlapping the PSFCH transmission slot.

Based on an embodiment of the present disclosure, the reference point related to a time at which the UE transmits a PUCCH may be different, based on at least one of whether a PSFCH resource is configured in a resource pool, the amount of PSFCH candidate resources in the resource pool, whether PSFCH transmission is enabled for a TB corresponding to HARQ-ACK feedback reported to the base station by the UE, and/or whether PSFCH transmission is enabled for a specific period of a configured grant (CG) corresponding to HARQ-ACK feedback reported to the base station by the UE. For example, the UE may determine the reference point related to the PUCCH transmission timing, based on at least one of whether a PSFCH resource is configured in a resource pool, the amount of PSFCH candidate resources in the resource pool, whether PSFCH transmission is enabled for a TB corresponding to HARQ-ACK feedback reported to the base station by the UE, and/or whether PSFCH transmission is enabled for a specific period of a CG corresponding to HARQ-ACK feedback reported to the base station by the UE.

For example, if the PSFCH resource is configured for the resource pool, and/or if the PSFCH transmission of the receiving UE is enabled for the TB or the specific period of the CG corresponding to the HARQ-ACK feedback to be reported by the transmitting UE to the base station, the reference point related to the PUCCH transmission timing may be a time when the receiving UE transmits a PSFCH to the transmitting UE. Specifically, for example, the reference point related to the PUCCH transmission timing may be a time when the receiving UE transmits a PSFCH related to the last PSSCH received within the specific period to the transmitting UE. For example, the reference point related to the PUCCH transmission timing may be a time when the receiving UE transmits a PSFCH related to the last received PSSCH among the PSSCH resource bundle to the transmitting UE.

For example, if the PSFCH resource is configured for the resource pool, and/or if the PSFCH transmission of the receiving UE is enabled for the TB or the specific period of the CG corresponding to the HARQ-ACK feedback to be reported by the transmitting UE to the base station, the reference point related to the PUCCH transmission timing may be a time when the transmitting UE receives a PSFCH from the receiving UE. Specifically, for example, the reference point related to the PUCCH transmission timing may be a time when the transmitting UE receives a PSFCH related to the last PSSCH transmitted within the specific period from the receiving UE. For example, the reference point related to the PUCCH transmission timing may be a time when the transmitting UE receives a PSFCH related to the last transmitted PSSCH among the PSSCH resource bundle from the receiving UE.

For example, if the PSFCH resource is not configured for the resource pool, and/or if the PSFCH transmission of the receiving UE is disabled for the TB or the specific period of the CG corresponding to the HARQ-ACK feedback to be reported by the transmitting UE to the base station, the reference point related to the PUCCH transmission timing may be a time when the transmitting UE transmits a PSCCH and/or a PSSCH to the receiving UE. Specifically, for example, the reference point related to the PUCCH transmission timing may be a time when the transmitting UE transmits the last PSCCH and/or the last PSSCH to the receiving UE within the specific period. For example, the reference point related to the PUCCH transmission timing may be a time when the transmitting UE transmits the last PSCCH and/or the last PSSCH among the PSSCH resource bundle to the receiving UE.

For example, if the PSFCH resource is not configured for the resource pool, and/or if the PSFCH transmission of the receiving UE is disabled for the TB or the specific period of the CG corresponding to the HARQ-ACK feedback to be reported by the transmitting UE to the base station, the reference point related to the PUCCH transmission timing may be a time when the base station transmits the corresponding PDCCH to the transmitting UE. For example, if the PSFCH resource is not configured for the resource pool, and/or if the PSFCH transmission of the receiving UE is disabled for the TB or the specific period of the CG corresponding to the HARQ-ACK feedback to be reported by the transmitting UE to the base station, the reference point related to the PUCCH transmission timing may be a time when the transmitting UE receives the corresponding PDCCH from the base station.

For example, if the PSFCH resource is not configured for the resource pool, and/or if the PSFCH transmission of the receiving UE is disabled for the TB or the specific period of the CG corresponding to the HARQ-ACK feedback to be reported by the transmitting UE to the base station, the reference point related to the PUCCH transmission timing may be a time when the transmitting UE determines that a PSFCH is received from the receiving UE on a PSFCH resource which is virtually (pre-)configured for the determination of the PUCCH transmission timing. For example, if the PSFCH resource is not configured for the resource pool, and/or if the PSFCH transmission of the receiving UE is disabled for the TB or the specific period of the CG corresponding to the HARQ-ACK feedback to be reported by the transmitting UE to the base station, the reference point related to the PUCCH transmission timing may be a time when the transmitting UE determines that a PSFCH is transmitted by the receiving UE on a PSFCH resource which is virtually (pre-)configured for the determination of the PUCCH transmission timing. Herein, the receiving UE does not actually transmit the PSFCH to the transmitting UE, but the transmitting UE may determine that the transmission timing or the reception timing of the PSFCH assumed to be transmitted by the receiving UE on the configured virtual PSFCH resource is the reference point related to the PUCCH transmission timing.

In the above-described embodiment, a case in which the PSFCH transmission of the receiving UE is disabled for the TB or the specific period of the CG corresponding to the HARQ-ACK feedback to be reported by the transmitting UE to the base station may be a case in which the HARQ-ACK feedback is disabled by an upper layer (e.g., MAC layer) of the transmitting UE with respect to a packet transmitted by the transmitting UE to the receiving UE at the corresponding time. For example, a case in which the PSFCH transmission of the receiving UE is disabled for the TB or the specific period of the CG corresponding to the HARQ-ACK feedback to be reported by the transmitting UE to the base station may be a case in which PSFCH transmission of the receiving UE or PSFCH reception of the transmitting UE is canceled due to congestion control, etc.

For example, the UE may transmit the UCI for SL transmission to the base station through a PUCCH or a PUSCH. Herein, in particular, in the case of the PUCCH, the PUCCH resource (e.g., time/frequency/sequence resource) needs to be defined. For example, a PUCCH resource indicator may be included in a DCI for SL resource allocation, and the PUCCH resource to transmit the UCI may be indicated by the PUCCH resource indicator. In this case, for example, candidate values for the PUCCH resource may be predefined for the UE. Alternatively, for example, candidate values for the PUCCH resource may be configured for the UE through higher layer signaling. For example, the UE may finally select the PUCCH resource based on the indicator included in the DCI and/or the resource (e.g., a control channel element (CCE)) through which the PDCCH including the DCI is transmitted. Alternatively, for example, the PUCCH resource for UCI transmission may be configured for the UE through higher layer signaling. Specifically, for example, based on a method of allocating SL resources (e.g., one-shot or semi-persistent), the UE may select the PUCCH resource in a different manner.

Based on an embodiment of the present disclosure, if at least one of the following conditions is satisfied, the mode 1 UE may perform mode 2-based resource (re)selection and TB transmission for a specific TB. For example, if at least one condition among the cases related to the questions in Table 7 (e.g., Question D2 to Question D8) is satisfied, the mode 1 UE may perform mode 2-based resource (re)selection and TB transmission for the specific TB.

For example, if at least one of the following conditions is satisfied, the mode 1 UE may perform TB transmission based on an exceptional pool for a specific TB. For example, if at least one condition among the cases related to the questions in Table 7 (e.g., Question D2 to Question D8) is satisfied, the mode 1 UE may perform exceptional pool-based TB transmission for the specific TB.

For example, performing, by the UE, TB transmission on the exceptional pool may include: i) performing, by the UE, initial transmission related to the TB on a normal pool, and ii) performing, by the UE, retransmission (e.g., necessary retransmission or remaining retransmission) related to the TB on the exceptional pool if at least one of the following conditions (or the cases related to the questions in Table 7 (e.g., Question D2 to Question D8)) is satisfied. That is, in this case, the UE may perform the initial transmission related to the TB on the normal pool, and the UE may perform the retransmission related to the TB on the exceptional pool. For example, performing, by the UE, TB transmission on the exceptional pool may include: performing, by the UE, the initial transmission related to the TB on the exceptional pool if at least one of the following conditions (or the cases related to the questions in Table 7 (e.g., Question D2 to Question D8)) is satisfied. That is, in this case, the UE may perform both initial transmission and retransmission related to the TB on the exceptional pool.

For example, if at least one of the following conditions is satisfied, the mode 1 UE may perform blind retransmission. For example, if at least one condition among the cases related to the questions in Table 7 (e.g., Question D2 to Question D8) is satisfied, the mode 1 UE may perform blind retransmission.

For example, performing, by the UE, blind retransmission may include: transmitting, by the UE, a TB or a MAC protocol data unit (PDU) by setting a predefined HARQ feedback request field value in a SCI to a "NOT REQUESTED" state, if at least one of the following conditions is satisfied, although the TB or the MAC PDU transmitted by the UE includes data related to HARQ ENABLED LCH(s). In the present disclosure, HARQ ENABLED Logical Channel(s) (LCH(s)) related data may be a MAC PDU or a TB configured with a logical channel for which HARQ feedback is enabled. For example, performing, by the UE, blind retransmission may include: transmitting, by the UE, a TB or a MAC PDU by setting a predefined HARQ feedback request field value in a SCI to a "NOT REQUESTED" state, if at least one condition among the cases related to the questions in Table 7 (e.g., Question D2 to Question D8) is satisfied, although the TB or the MAC PDU transmitted by the UE includes data related to HARQ ENABLED LCH(s). For example, performing, by the UE, blind retransmission may include: transmitting, by the UE, a TB or a MAC PDU by setting a predefined HARQ feedback request field value in a SCI to a "NOT REQUESTED" state, if a PUCCH resource is not configured through a SL grant related to transmission of the TB or the MAC PDU, although the TB or the MAC PDU transmitted by the UE includes data related to HARQ ENABLED LCH(s). For example, performing, by the UE, blind retransmission may include: transmitting, by the UE, a TB or a MAC PDU by setting a predefined HARQ feedback request field value in a SCI to a "NOT REQUESTED" state, if a PSFCH resource is not configured for the resource pool, although the TB or the MAC PDU transmitted by the UE includes data related to HARQ ENABLED LCH(s).

For example, if the TB or the MAC PDU transmitted by the UE includes data related to HARQ ENABLED LCH(s), and if at least one of the following conditions is satisfied, the UE may be configured to skip transmission of the TB or the MAC PDU. For example, if the TB or the MAC PDU transmitted by the UE includes data related to HARQ ENABLED LCH(s), and if at least one condition among the cases related to the questions in Table 7 (e.g., Question D2 to Question D8) is satisfied, the UE may be configured to skip transmission of the TB or the MAC PDU. For example, if the TB or the MAC PDU transmitted by the UE includes data related to HARQ ENABLED LCH(s), and if a PUCCH resource is not configured through a SL grant related to transmission of the TB or the MAC PDU, the UE may be configured to skip transmission of the TB or the MAC PDU. For example, if the TB or the MAC PDU transmitted by the UE includes data related to HARQ ENABLED LCH(s), and if a PSFCH resource is not configured for the resource pool, the UE may be configured to skip transmission of the TB or the MAC PDU. In the above-described case, the UE may not transmit the TB or the MAC PDU.

For example, if at least one of the following conditions is satisfied, the mode 1 UE may perform TB retransmission regardless of whether or not HARQ information related to TB transmission is received. For example, if at least one condition among the cases related to the questions in Table 7 (e.g., Question D2 to Question D8) is satisfied, the mode 1 UE may perform TB retransmission regardless of whether or not HARQ information related to TB transmission is received. Specifically, for example, regardless of the HARQ feedback state, the mode 1 UE may perform SL retransmission by using resource(s) allocated/reserved by the base station through a dynamic grant (DG) or a configured grant (CG). Herein, the mode 1 UE may be a UE which performs SL communication based on the resource allocation mode 1. Specifically, for example, the TB may include a MAC message for which HARQ feedback is enabled. For example, whether the rule is applied or not may be configured to the UE for each resource pool. For example, whether the rule is applied or not may be configured to the UE for each priority of a service or a packet. For example, if the priority of the service or the packet to be transmitted by the UE is high, the UE may not drop the corresponding TB, and the UE may perform TB transmission based on another mode (or blind retransmission). For example, if the priority of the service or the packet to be transmitted by the UE is high, the UE may not drop the corresponding TB, and the UE may perform TB transmission on the exceptional pool.

Hereinafter, conditions for the UE to perform the above-described operation will be described in detail.

If the UE does not perform transmission as many times as the required number of transmissions (TX_NUM) based on mode 1 CG resources, e.g., if the UE does not perform transmission as many times as the pre-configured maximum number of transmissions (TX_NUM) based on mode 1 CG resources, e.g., if the UE does not perform transmission as many times as the pre-configured minimum number of transmissions (TX_NUM) based on mode 1 CG resources, e.g., if a packet generation timing of the UE is close to the end time of a period of CG resources, and/or If the UE does not perform transmission as many times as the required number of transmissions (TX_NUM) based on mode 1 dynamic grant (DG) resource(s), e.g., if the UE does not perform transmission as many times as the pre-configured maximum number of transmissions (TX_NUM) based on mode 1 DG resource(s), e.g., if the UE does not perform transmission as many times as the pre-configured minimum number of transmissions (TX_NUM) based on mode 1 DG resource(s), and/or If the UE drops (all) SL transmission based on a (configured) SL grant, e.g., if the UE omits SL transmission due to a collision between UL transmission and SL transmission, and/or

TABLE 7

Question D2: Can MAC select either LCHs with FB disabled or LCHs with FB enabled
    for a SL grant configured with both PSFCH and PUCCH in SL LCP?
        Option D2-1: Yes, MAC can select one of both types of logical channels
            Option D2-2: No, MAC can only select LCHs with FB enabled.
                Option D2-3: Other?
Question D3: (If D1-1 is chosen) Can MAC select either LCHs with FB disabled or LCHs
with FB enabled for a SL grant configured with PSFCH but without PUCCH in SL LCP?
Note that a SL grant could be configured with PSFCH but without PUCCH when UE is not
in RRC_CONNECTED or UE in RRC_CONNECTED has such configuration in either
                      mode 1 or mode 2.
        Option D3-1: Yes, MAC can select one of both types of logical channels
            Option D3-2: No, MAC can only select LCHs with FB enabled.
                Option D3-3: Other?
Question D4: (If D2-2 or D3-2 is chosen) what should UE do if UE only has SL data on
      LCHs with FB disabled for a SL grant configured with PSFCH?
    Option D4-1: UE can exceptionally select the LCHs with FB disabled for the SL
            grant and transmit a TB with HARQ feedback.
      Option D4-2: The SL grant is skipped and so not used for transmission.
    Option D4-3: UE reselects to a resource pool having no PSFCH resource (only for
                      Mode 2)
                Option D4-4: Other?
Question D5: Can MAC select either LCHs with FB disabled or LCHs with FB enabled
    for a SL grant configured with neither PSFCH nor PUCCH in SL LCP?
           Option D5-1: Yes, MAC can select one of both logical channels
           Option D5-2: No, MAC can only select LCHs with FB disabled.
                Option D5-3: Other?
Question D6: (If D1-1 is chosen) Can MAC select either LCHs with FB disabled or LCHs
with FB enabled for a SL grant configured without PSFCH but with PUCCH in SL LCP?
        Option D6-1: Yes, MAC can select one of both types of logical channels
            Option D6-2: No, MAC can only select LCHs with FB disabled.
                Option D6-3: Other?
Question D7: (If D5-2 or D6-2 is chosen) what should UE do if UE only has SL data on
        LCHs with FB enabled for a SL grant configured without PSFCH?
    Option D7-1: UE can exceptionally select the LCHs with FB enabled for the SL
            grant and transmit a TB without HARQ feedback.
      Option D7-2: The SL grant is skipped and so not used for transmission.
    Option D7-3: UE reselects to a resource pool having PSFCH resource (only for
                      Mode 2)
                Option D7-4: Other?
Question D8: What is carried on PUCCH for a SL grant configured without PSFCH but
                        with PUCCH?
    Option D8-1: When a retransmission grant is needed for a TB in a sidelink process,
              UE sends NACK. Otherwise, UE sends ACK.
                Option D8-2: Other?

If a procedure for the UE to report HARQ feedback for SL resource(s) or SL transmission to the base station or the serving cell is disabled, e.g., if PUCCH transmission of the UE is disabled by a DCI related to mode 1 DG resource(s), or if all or part of PSFCH transmission/reception related to mode 1 DG resource(s) is disabled, e.g., if PUCCH transmission of the UE is disabled for SL resources based on a (configured) SL grant, or if all or part of PSFCH transmission/reception related to SL resources based on a (configured) SL grant is disabled, and/or If a procedure for the UE to report HARQ feedback for SL resource(s) or SL transmission to the base station or the serving cell is canceled (or is expected to be canceled), e.g., if the UE cancels transmission of the HARQ feedback because a priority of the HARQ feedback reported by the UE to the base station is lower than a priority of SL transmission of the UE or a priority of other UL transmissions, and/or If the UE which performs SL transmission by using allocated or allowed mode 1 CG resources does not satisfy the packet delay budget (PDB), e.g., if the UE determines that the remaining packet or the remaining data cannot be transmitted in the remaining PDB for a specific packet or a specific data, and/or If the UE which performs SL transmission by using SL resources allocated or allowed based on a (configured) SL grant does not satisfy the PDB, e.g., if the UE determines that the remaining packet or the remaining data cannot be transmitted in the remaining PDB for a specific packet or a specific data;

For example, in the case in which (mode 1) (configured) SL grant (e.g., CG) exists, if the UE does not transmit transmission as many times as TX_NUM for a specific TB (e.g., see the example above), the UE may not generate a MAC PDU at the time of packet arrival (on the buffer). For example, the UE may delay generating the MAC PDU. For example, the UE may delay generating the MAC PDU until resources that can perform transmission as many times as TX_NUM appears. Here, for example, for a MAC PDU generated with a delay, a mode 1 resource request based on an SR and/or a BSR may be allowed for the UE. For example, the UE may transmit the SR and/or the BSR to the base station and request the base station to allocate mode 1 resource(s) for transmission of the delayed MAC PDU. For example, whether the above-described rule is applied or not may be configured to the UE for each resource pool. For example, whether the above-described rule is applied or not may be configured to the UE for each priority of a service or a packet.

Based on an embodiment of the present disclosure, SL CSI reporting may be triggered for the UE. In this case, the UE may transmit SL CSI to another UE by using a SL resource.

For example, if the UE fails to perform SL CSI reporting on the currently allocated mode 1 resource (e.g., if the UE has already used the resource configured in the current CG period for transmission of other data), and/or if a PDB related to SL CSI reporting is not satisfied in case the UE transmits SL CSI by using the next mode 1 resource (e.g., if the remaining PDB value related to SL CSI reporting is not sufficient until the next mode 1 resource), it may be allowed for the UE to request a mode 1 resource (e.g., DG) from the base station based on an SR and/or a BSR, exceptionally. In this case, for example, the UE may transmit the SR and/or the BSR to the base station to request the mode 1 resource (e.g., DG) from the base station, and the base station may transmit information (e.g., DG) related to a SL resource to the UE by allocating the SL resource. In addition, the UE may transmit SL CSI by using the SL resource. For example, whether the above-described rule is applied or not may be configured to the UE for each resource pool. For example, whether the above-described rule is applied or not may be configured to the UE for each priority of a service or a packet.

For example, if the UE fails to perform SL CSI reporting on the currently selected/reserved mode 2 resource, and/or if a PDB related to SL CSI reporting is not satisfied in case the UE transmits SL CSI by using the next mode 2 resource (e.g., if the remaining PDB value related to SL CSI reporting is not sufficient until the next mode 2 resource), the UE may perform resource reselection by triggering resource reselection, exceptionally, and the UE may transmit SL CSI by using the reselected resource. For example, if the UE fails to perform SL CSI reporting on the currently selected/reserved mode 2 resource, and/or if a PDB related to SL CSI reporting is not satisfied in case the UE transmits SL CSI by using the next mode 2 resource (e.g., if the remaining PDB value related to SL CSI reporting is not sufficient until the next mode 2 resource), the UE may transmit SL CSI by using an exceptional pool, exceptionally. For example, whether the above-described rule is applied or not may be configured to the UE for each resource pool. For example, whether the above-described rule is applied or not may be configured to the UE for each priority of a service or a packet.

Meanwhile, in the next-generation system, if UL transmission and SL transmission of the UE collide in the same serving cell, the UE may select and perform either UL transmission or SL transmission according to a priority and may drop the remaining transmission. In addition, in the next-generation system, if UL transmission and SL transmission of the UE overlap in time in different serving cells, the UE may use transmit power less than or equal to the maximum power of the UE by lowering power of SL transmission or UL transmission according to a priority through power control. Herein, the UE may determine whether the priority of the UL transmission is high or the priority of the SL transmission is high, by comparing an L1-priority (e.g., a value indicated by a SCI) for SL transmission with a (pre-)configured threshold.

Specifically, for example, in the case of UL transmission which does not include SL HARQ report, the threshold may be configured or pre-configured differently for the UE, based on whether or not the UL transmission corresponds to URLLC (or whether or not a "priority value" included in a DCI related to the UL transmission is 1 and/or whether or not a "priority value" of the UL transmission (e.g., RRC message) is 1).

For example, in the case of UL transmission including a SL HARQ report, between the UL transmission and the SL transmission, the UE may directly compare a priority value corresponding to the SL HARQ report with a priority value corresponding to the SL transmission, and the UE may set/determine a high priority of transmission having a high priority. For example, the priority of the SL HARQ report may be a priority of a PSFCH corresponding to the SL HARQ report, and the priority of the PSFCH may inherit or follow a priority of a PSCCH and/or a PSSCH corresponding to the PSFCH. Meanwhile, in the case of the SL HARQ report, the PSFCH corresponding to the SL HARQ report may not always exist. In this case, it is necessary to determine a priority or a dropping rule and/or a power control method.

In the present disclosure, the larger the priority value is, the lower the priority may be. For example, assuming that a priority value related to first transmission is 1 and a priority value related to second transmission is 2, the priority of the first transmission may be higher than that of the second transmission.

Based on an embodiment of the present disclosure, a base station may transmit one or more resources to the UE by transmitting a configured grant (CG) to the UE. Herein, if the UE does not perform PSCCH/PSSCH transmission on resource(s) within a specific period among one or more resources corresponding to the CG (e.g., if the UE skips/omits SL transmission), the UE may transmit a SL HARQ report (e.g., ACK) with respect to the specific period to the base station. Herein, if the base station receives the ACK, the base station may not unnecessarily allocate retransmission resource(s) to the UE.

In this case, since there is no PSFCH and/or no PSCCH and/or no PSSCH corresponding to the SL HARQ report, a priority value may also not be defined. In this case, for example, priority value(s) of the UL transmission for the SL HARQ report due to the omission of the SL transmission may be configured or pre-configured for the UE for each CG configuration. For example, priority value(s) of the UL transmission for the SL HARQ report due to the omission of the SL transmission may be configured or pre-configured for the UE for each resource pool. For example, priority value(s) of the UL transmission for the SL HARQ report due to the omission of the SL transmission may be configured or pre-configured for the UE for each SL BWP. For example, priority value(s) of the UL transmission for the SL HARQ report due to the omission of the SL transmission may be configured or pre-configured for the UE for each HARQ process number. For example, priority value(s) of the UL transmission for the SL HARQ report due to the omission of the SL transmission may be configured or pre-configured for the UE for each HARQ state. In the present disclosure, "configuration/configure/configured" may include "operation of the base station/network to transmit information related to the configuration to the UE".

For example, a priority value of the UL transmission for the SL HARQ report due to the omission of the SL transmission may be set to the smallest value among (pre-)configured or possible priority values. For example, the UE may set the priority value of the UL transmission for the SL HARQ report due to the omission of the SL transmission to the smallest value among (pre-)configured or possible priority values. For example, the PUCCH and/or the PUSCH may have a higher priority than other SL transmissions. For example, the PUCCH and/or the PUSCH may have a higher priority than other UL transmissions. In the above case, the UL may be limited to a case that does not correspond to URLLC, and in this case, a priority of the UL corresponding to URLLC may be higher. The comparison between the ULs may be limited to being applied to the case of a dropping rule.

For example, a priority value of the UL transmission for the SL HARQ report due to the omission of the SL transmission may be set to the largest value among (pre-)configured or possible priority values. For example, the PUCCH and/or the PUSCH may have a lower priority than other SL transmissions. For example, the PUCCH and/or the PUSCH may have a lower priority than other UL transmissions. The comparison between the ULs may be limited to being applied to the case of a dropping rule.

Based on an embodiment of the present disclosure, the base station may allocate one or more resources to the UE, by transmitting a CG to the UE. Herein, if the UE does not perform PSCCH/PSSCH transmission on resource(s) within a specific period among one or more resources corresponding to the CG (e.g., if the UE skips/omits SL transmission), the UE may transmit a SL HARQ report (e.g., NACK) with respect to the specific period to the base station. For example, if the UE drops scheduled PSCCH/PSSCH transmission, the UE does not expect to receive a PSFCH corresponding to the PSCCH/PSSCH transmission, but the UE may report the NACK to the base station.

For example, priority value(s) of the UL transmission for the SL HARQ report due to the omission of the SL transmission may be configured or pre-configured for the UE for each dynamic grant (DG) configuration. For example, priority value(s) of the UL transmission for the SL HARQ report due to the omission of the SL transmission may be configured or pre-configured for the UE for each CG configuration. For example, priority value(s) of the UL transmission for the SL HARQ report due to the omission of the SL transmission may be configured or pre-configured for the UE for each resource pool. For example, priority value(s) of the UL transmission for the SL HARQ report due to the omission of the SL transmission may be configured or pre-configured for the UE for each SL BWP. For example, priority value(s) of the UL transmission for the SL HARQ report due to the omission of the SL transmission may be configured or pre-configured for the UE for each HARQ process number. For example, priority value(s) of the UL transmission for the SL HARQ report due to the omission of the SL transmission may be configured or pre-configured for the UE for each HARQ state.

For example, a priority value of the UL transmission for the SL HARQ report due to the omission of the SL transmission may be set to the smallest value among (pre-)configured or possible priority values. For example, the UE may set the priority value of the UL transmission for the SL HARQ report due to the omission of the SL transmission to the smallest value among (pre-)configured or possible priority values. For example, the PUCCH and/or the PUSCH may have a higher priority than other SL transmissions. For example, the PUCCH and/or the PUSCH may have a higher priority than other UL transmissions. In the above case, the UL may be limited to a case that does not correspond to URLLC, and in this case, a priority of the UL corresponding to URLLC may be higher. The comparison between the ULs may be limited to being applied to the case of a dropping rule.

For example, a priority value of the UL transmission for the SL HARQ report due to the omission of the SL transmission may be set to the largest value among (pre-)configured or possible priority values. For example, the PUCCH and/or the PUSCH may have a lower priority than other SL transmissions. For example, the PUCCH and/or the PUSCH may have a lower priority than other UL transmissions. The comparison between the ULs may be limited to being applied to the case of a dropping rule. For example, a priority of the PUCCH and/or the PUSCH may inherit or follow the priority of the scheduled PSCCH transmission and/or the scheduled PSSCH transmission.

Figure 16:
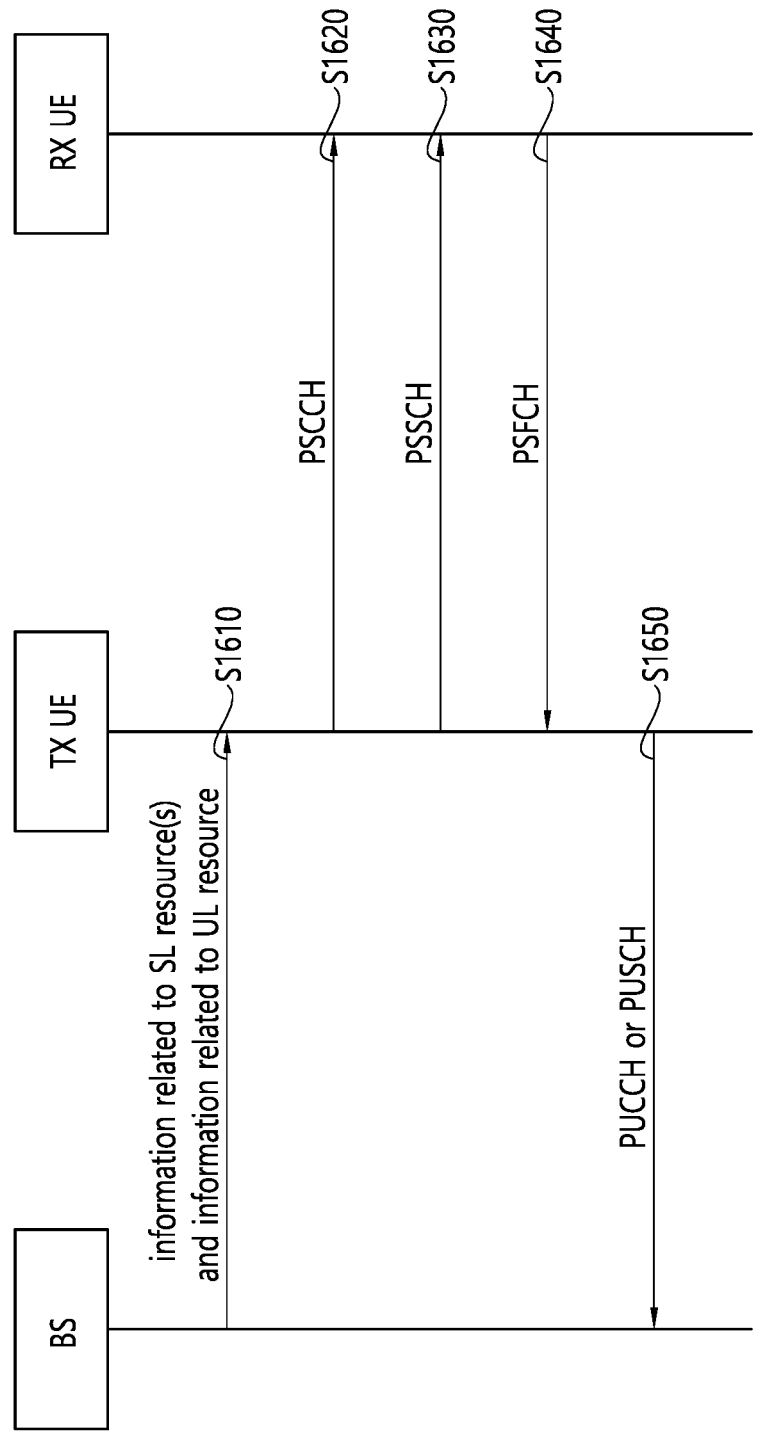
FIG. 16 shows a procedure for a transmitting UE to report SL HARQ feedback information to a base station, based on an embodiment of the present disclosure.

FIG. 16 shows a procedure for a transmitting UE to report SL HARQ feedback information to a base station, based on an embodiment of the present disclosure. The embodiment of FIG. 16 may be combined with various embodiments of the present disclosure.

Referring to FIG. 16, in step S1610, the base station may transmit information related to SL resource(s) and information related to a UL resource to the transmitting UE. For example, in the case of CG type 1-based resource allocation, the base station may allocate/configure the SL resource(s) and the UL resource to the transmitting UE through an RRC message. For example, in the case of CG type 2-based resource allocation, the base station may allocate/configure the SL resource(s) and the UL resource to the transmitting UE through an RRC message and a DCI. For example, in the case of DG-based resource allocation, the base station may allocate/configure the SL resource(s) and the UL resource to the transmitting UE through a DCI. For example, the SL resource(s) may be resource(s) related to PSCCH transmission and/or PSSCH transmission. For example, the UL resource may be a resource related to PUCCH transmission. For example, the UL resource may be a resource related to PUSCH transmission.

Figure 17:
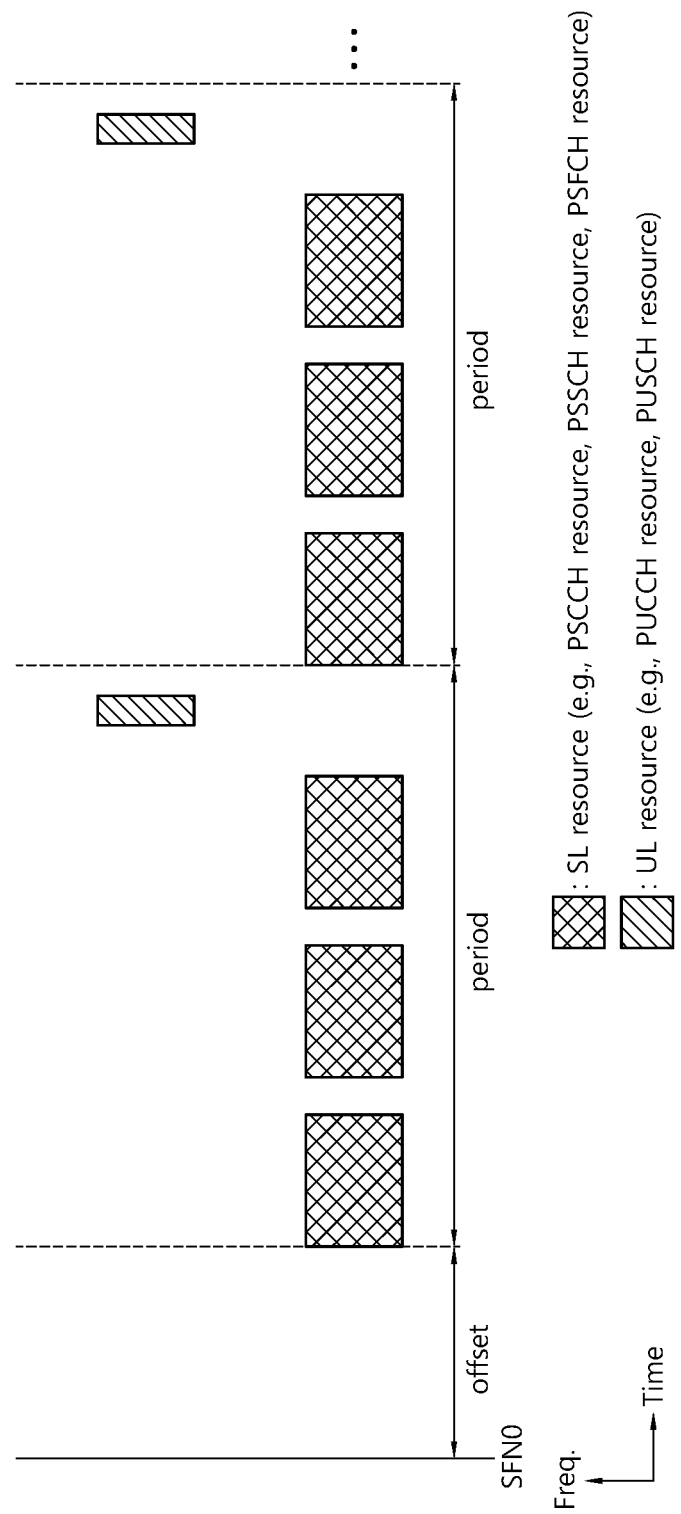
FIG. 17 shows an example of resource allocation based on CG type 1 or CG type 2, based on an embodiment of the present disclosure.

FIG. 17 shows an example of resource allocation based on CG type 1 or CG type 2, based on an embodiment of the present disclosure. The embodiment of FIG. 17 may be combined with various embodiments of the present disclosure.

Referring to FIG. 17, the base station may allocate periodic resources to the transmitting UE through a DCI and/or an RRC message related to a CG.

Referring back to FIG. 16, in step S1620, the transmitting UE may transmit a PSCCH to the receiving UE based on information related to the SL resource(s). In step S1630, the transmitting UE may transmit a PSSCH related to the PSCCH to the receiving UE.

In step S1640, the transmitting UE may receive SL HARQ feedback information from the receiving UE through a PSFCH related to the PSSCH. For example, the transmitting UE and the receiving UE may determine a PSFCH resource related to the PSSCH, and the transmitting UE may receive SL HARQ feedback from the receiving UE based on the PSFCH resource.

In step S1650, the transmitting UE may transmit SL HARQ feedback information to the base station. Herein, for example, if the transmitting UE receives SL HARQ feedback information from the receiving UE, the SL HARQ feedback information may be the SL HARQ feedback information received from the receiving UE. For example, if the transmitting UE receives SL HARQ feedback information from the receiving UE, the SL HARQ feedback information may be HARQ feedback information generated by the transmitting UE based on the SL HARQ feedback information received from the receiving UE. For example, if the transmitting UE does not receive SL HARQ feedback information from the receiving UE, the SL HARQ feedback information may be HARQ feedback information generated by the transmitting UE.

Figure 18:
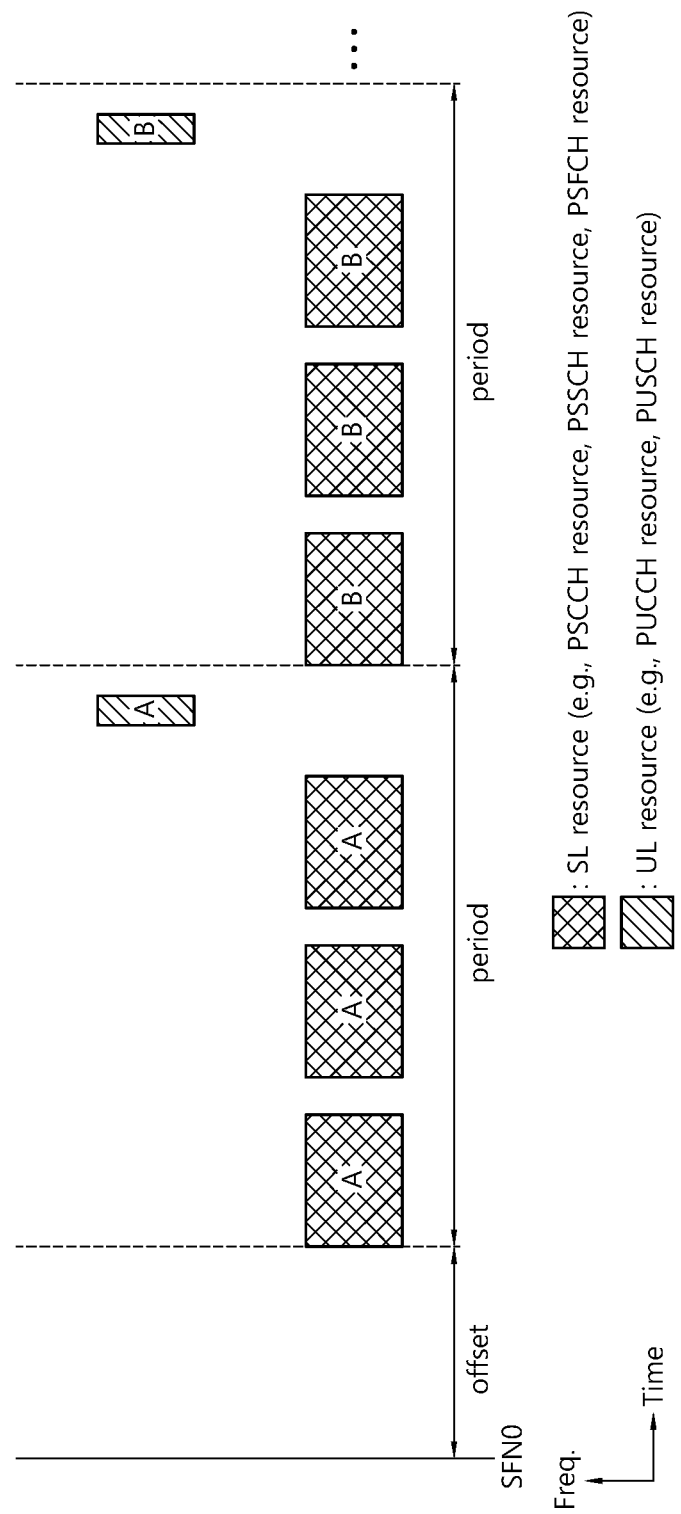
FIG. 18 shows a method for a transmitting UE to report SL HARQ feedback information to a base station if the transmitting UE does not perform SL transmission by using resources within a specific period, based on an embodiment of the present disclosure.

FIG. 18 shows a method for a transmitting UE to report SL HARQ feedback information to a base station if the transmitting UE does not perform SL transmission by using resources within a specific period, based on an embodiment of the present disclosure. The embodiment of FIG. 18 may be combined with various embodiments of the present disclosure.

Referring to FIG. 18, it is assumed that the transmitting UE performs SL transmission by using SL resources corresponding to A. In this case, the transmitting UE may receive SL HARQ feedback information from the receiving UE, and the transmitting UE may report the SL HARQ feedback information to the base station.

On the other hand, it is assumed that the transmitting UE does not perform SL transmission by using SL resources corresponding to B. For example, the transmitting UE may not transmit a PSCCH by using SL resources corresponding to B. In this case, the transmitting UE may generate ACK information, and the transmitting UE may perform UL transmission (e.g., PUCCH transmission) including the ACK information to the base station. Herein, for example, a priority of UL transmission (e.g., PUCCH transmission) may be the same as the largest priority value among possible priority values for the CG. For example, the transmitting UE may determine a priority of the ACK information based on Table 8.

TABLE 8

The UE generates an ACK if the UE does not transmit a PSCCH with a SCI format 1-A scheduling a PSSCH in any of the resources provided by a configured grant in a single period and for which the UE is provided a PUCCH resource to report HARQ-ACK information. The priority value of the ACK is same as the largest priority value among the possible priority values for the configured grant.

Based on an embodiment of the present disclosure, the UE may disable PSFCH transmission. In this case, the UE may report ACK or NACK to the base station (at least for unicast and/or groupcast HARQ feedback option 2) based on whether additional resource(s) for PSCCH/PSSCH is required or not.

For example, priority value(s) of the UL transmission for the SL HARQ report for the disabled PSFCH may be configured or pre-configured for the UE for each dynamic grant (DG) configuration. For example, priority value(s) of the UL transmission for the SL HARQ report for the disabled PSFCH may be configured or pre-configured for the UE for each CG configuration. For example, priority value(s) of the UL transmission for the SL HARQ report for the disabled PSFCH may be configured or pre-configured for the UE for each resource pool. For example, priority value(s) of the UL transmission for the SL HARQ report for the disabled PSFCH may be configured or pre-configured for the UE for each SL BWP. For example, priority value(s) of the UL transmission for the SL HARQ report for the disabled PSFCH may be configured or pre-configured for the UE for each HARQ process number. For example, priority value(s) of the UL transmission for the SL HARQ report for the disabled PSFCH may be configured or pre-configured for the UE for each HARQ state.

For example, a priority value of the UL transmission for the SL HARQ report for the disabled PSFCH may be set to the smallest value among (pre-)configured or possible priority values. For example, the UE may set a priority value of the UL transmission for the SL HARQ report for the disabled PSFCH to the smallest value among (pre-)configured or possible priority values. For example, the PUCCH and/or the PUSCH may have a higher priority than other SL transmissions. For example, the PUCCH and/or the PUSCH may have a higher priority than other UL transmissions. In the above case, the UL may be limited to a case that does not correspond to URLLC, and in this case, a priority of the UL corresponding to URLLC may be higher. The comparison between the ULs may be limited to being applied to the case of a dropping rule.

For example, a priority value of the UL transmission for the SL HARQ report for the disabled PSFCH may be set to the largest value among (pre-)configured or possible priority values. For example, the PUCCH and/or the PUSCH may have a lower priority than other SL transmissions. For example, the PUCCH and/or the PUSCH may have a lower priority than other UL transmissions. The comparison between the ULs may be limited to being applied to the case of a dropping rule. For example, a priority of the PUCCH and/or the PUSCH may be different based on the HARQ state. For example, a priority of the PUCCH and/or the PUSCH may inherit or follow a priority of PSCCH transmission and/or PSSCH transmission corresponding to the PUCCH and/or the PUSCH.

Based on an embodiment of the present disclosure, if the UE performs TB transmission as many times as the maximum number of transmissions for the TB, the UE may transmit a SL HARQ report (e.g., ACK or NACK) to the base station. For example, if the UE performs TB transmission exceeding the maximum number of transmissions for the TB, the UE may transmit the SL HARQ report (e.g., ACK or NACK) to the base station.

In the above-described case, for example, priority value(s) of the UL transmission for the SL HARQ report may be configured or pre-configured for the UE for each dynamic grant (DG) configuration. For example, priority value(s) of the UL transmission for the SL HARQ report may be configured or pre-configured for the UE for each CG configuration. For example, priority value(s) of the UL transmission for the SL HARQ report may be configured or pre-configured for the UE for each resource pool. For example, priority value(s) of the UL transmission for the SL HARQ report may be configured or pre-configured for the UE for each SL BWP. For example, priority value(s) of the UL transmission for the SL HARQ report may be configured or pre-configured for the UE for each HARQ process number. For example, priority value(s) of the UL transmission for the SL HARQ report may be configured or pre-configured for the UE for each HARQ state.

For example, a priority value of the UL transmission for the SL HARQ report may be set to the smallest value among (pre-)configured or possible priority values. For example, the UE may set a priority value of the UL transmission for the SL HARQ report to the smallest value among (pre-)configured or possible priority values. For example, the PUCCH and/or the PUSCH may have a higher priority than other SL transmissions. For example, the PUCCH and/or the PUSCH may have a higher priority than other UL transmissions. In the above case, the UL may be limited to a case that does not correspond to URLLC, and in this case, a priority of the UL corresponding to URLLC may be higher. The comparison between the ULs may be limited to being applied to the case of a dropping rule.

For example, a priority value of the UL transmission for the SL HARQ report may be set to the largest value among (pre-)configured or possible priority values. For example, the PUCCH and/or the PUSCH may have a lower priority than other SL transmissions. For example, the PUCCH and/or the PUSCH may have a lower priority than other UL transmissions. The comparison between the ULs may be limited to being applied to the case of a dropping rule. For example, a priority of the PUCCH and/or the PUSCH may be different based on the HARQ state. For example, a priority of the PUCCH and/or the PUSCH may inherit or follow a priority of PSCCH transmission and/or PSSCH transmission corresponding to the PUCCH and/or the PUSCH Based on an embodiment of the present disclosure, if the UE transmits the SL HARQ report to the base station through the PUSCH, the PUSCH may have a priority value of the SL HARQ report and a priority value of the UL transmission. Specifically, for example, the priority of the UL transmission corresponds to URLLC if a "priority value" is 1 through an RRC configuration and/or a DCI indication value corresponding to the UL transmission. In addition, the priority of the UL transmission corresponds to enhanced mobile broadband (eMBB) if a "priority value" is 0 through an RRC configuration and/or a DCI indication value corresponding to the UL transmission. If there is no indication value for the "priority value" on a DCI, the UE may assume/determine the corresponding value as 0. The priority setting between the PUSCH and the SL transmission may be performed by the UE in the following manner.

For example, the UE may ignore a priority of the SL HARQ report on the PUSCH, and may set a priority based on a general priority setting method between the UL transmission and the SL transmission.

In this case, for example, if a priority of the UL transmission is high, the UE may set a priority of the PUSCH to be high while the PUSCH includes the SL HARQ report. That is, in the case of the dropping rule, the UE may transmit the PUSCH, and in the case of power control, the UE may readjust (e.g., reduce) power of the SL transmission based on the maximum power of the UE.

On the other hand, for example, if a priority of the SL transmission is high, the UE may directly compare a priority value between the SL HARQ report and the SL transmission through the following process. If a priority of the SL HARQ report is high, the UE may transmit the SL HARQ report through the PUCCH instead of the PUSCH. On the other hand, if a priority of the SL transmission is high, in the case of the dropping rule, the UE may drop the SL HARQ report, and in the case of power control, the UE may readjust (e.g., reduce) power of the UL transmission based on the maximum power of the UE.

For example, only if a priority of the SL transmission is higher than a priority of the UL transmission, which is assumed not to include the SL HARQ report, and the priority of the SL transmission is higher than the priority of the SL HARQ report, the UE may set the priority of the SL transmission to be high. Otherwise, the UE may set the priority of the PUSCH to be high. Alternatively, for example, the UE may determine which transmission has a higher priority based on a priority setting method between the SL transmission and the UL transmission which is assumed not to include the SL HARQ report.

Meanwhile, a method for determining priorities between a PUSCH including a SL HARQ report and other UL transmissions needs to be defined. For example, the UE may prioritize UL transmission corresponding to "priority value=1", based on a "priority value" corresponding to each UL transmission, among a PUSCH and other UL transmissions assuming that the SL HARQ report is not included. Alternatively, for example, the UE may prioritize SL transmission or UL transmission by comparing a priority value for a SL HARQ report with a threshold value used according to a "priority value" of other UL transmissions.

Meanwhile, in the next-generation system, a physical priority of a PUCCH or a PUSCH may be different depending on URLLC or eMBB, and a priority index for the PUCCH or the PUSCH may be configured for the UE or indicated to the UE (through a DCI). Meanwhile, a procedure for resolving overlap between a plurality of PUCCHs or PUSCHs may be performed for each same priority index, and also, a UCI may be allowed to be piggybacked/transmitted through a PUSCH with the same priority index. Meanwhile, a priority index value may not be configured for a PUCCH including a SL HARQ-ACK report. In this case, it may be necessary to determine a priority index value to be assumed in the procedure for resolving overlap of the corresponding PUCCH and the UCI piggyback procedure.

For example, if the corresponding UE performs a URLLC-related operation or if a priority index 1 is set for at least one PUCCH or PUSCH, a priority index value of the PUCCH including the SL HARQ-ACK may be set to 1 for the UE. For example, if a SL priority threshold for URLLC (e.g., sl-PriorityThresholdULURLLC) is not configured/provided to the UE, a priority index value of the PUCCH including the SL HARQ-ACK may be set to 0 for the UE. For example, if a SL priority threshold for URLLC (e.g., sl-PriorityThresholdULURLLC) is configured/provided to the UE, a priority index value of the PUCCH including the SL HARQ-ACK may be set to 1 for the UE. For example, if a SL priority threshold for URLLC (e.g., sl-PriorityThresholdULURLLC) is configured/provided to the UE, and/or if a priority value of the PUCCH including the SL HARQ-ACK is smaller than sl-PriorityThresholdULURLLC, a priority index value of the PUCCH including the SL HARQ-ACK may be set to 1 for the UE. For example, if a SL priority threshold (e.g., sl-PriorityThresholdULURLLC) for URLLC is configured/provided to the UE, and/or if a priority value of the PUCCH including the SL HARQ-ACK is larger than or equal to sl-PriorityThresholdULURLLC, a priority index value of the PUCCH including the SL HARQ-ACK may be set to 0 for the UE. For example, a priority index may be indicated by a DCI corresponding to the PUCCH including the SL HARQ-ACK. In this case, for example, if there is no DCI corresponding to the PUCCH including the SL HARQ-ACK (in the case of type-1 CG), a priority index may be set to 0 or 1 in a DCI corresponding to the PUCCH including the SL HARQ-ACK.

A PUCCH or a PUSCH through which the SL HARQ-ACK can be transmitted may be different based on a priority index value of the PUCCH. Based on the priority index value of the PUCCH, all or part of PUCCH transmission or PUSCH transmission with the priority index 0 may be canceled by the PUCCH or the PUSCH through which the SL HARQ-ACK can be transmitted.

Since an example of a proposed method may also be included as one of implementation methods of the present disclosure, it may be regarded as a kind of proposed method of the present disclosure. While the above-described proposed methods may be independently implemented, some proposed methods may be implemented in combination (or merged). For example, the proposed methods of the present disclosure have been described in the context of a 3GPP NR system for the convenience of description, the scope of systems to which the proposed methods are applied may be extended to other systems in addition to the 3GPP NR system. For example, SL communication refers to communication between UEs via a direct radio channel, and when network equipment such as a BS transmits/receives a signal according to a UE-to-UE communication scheme, the network equipment may also be regarded as a kind of UE.

For example, the proposed methods of the present disclosure may be limitedly applied only to mode 1 operation. For example, the proposed methods of the present disclosure may be limitedly applied only to mode 2 operation. For example, the proposed methods of the present disclosure may be limitedly applied only to pre-configured/signaled (specific) V2X channel/signal transmission (e.g., PSSCH (and/or (associated) PSCCH and/or PSBCH)). For example, the proposed methods of the present disclosure may be limitedly applied only if the PSSCH and the (associated) PSCCH are transmitted adjacent to each other (in the frequency domain). For example, the proposed methods of the present disclosure may be limitedly applied only if the PSSCH and the (associated) PSCCH are transmitted non-adjacent (in the frequency domain). For example, the proposed methods of the present disclosure may be limitedly applied only if the PSSCH and the (associated) PSCCH are transmitted based on the previously configured/signaled MCS (and/or coding rate and/or RB) value/range.

For example, the proposed methods of the present disclosure may be limitedly applied only between a MODE 1 (and/or MODE 2) V2X carrier and(/or a MODE 2(/1)) SL(/UL)) an SPS (and/or SL(/UL) dynamic scheduling) carrier. For example, the proposed methods of the present disclosure may be limitedly applied only if the positions and/or number of (transmission and/or reception) resources (and/or the positions and/or number of subframes (and/or the size and/or number of subchannels) related to a V2X resource pool) is the same (and/or (some) different) between carriers. For example, the proposed methods of the present disclosure may be extended and applied to (V2X) communication between a base station and a UE. For example, the proposed methods of the present disclosure may be limitedly applied only to unicast (SL) communication. For example, the proposed methods of the present disclosure may be limitedly applied only to groupcast (SL) communication. For example, the proposed methods of the present disclosure may be limitedly applied only to broadcast (SL) communication.

Figure 19:
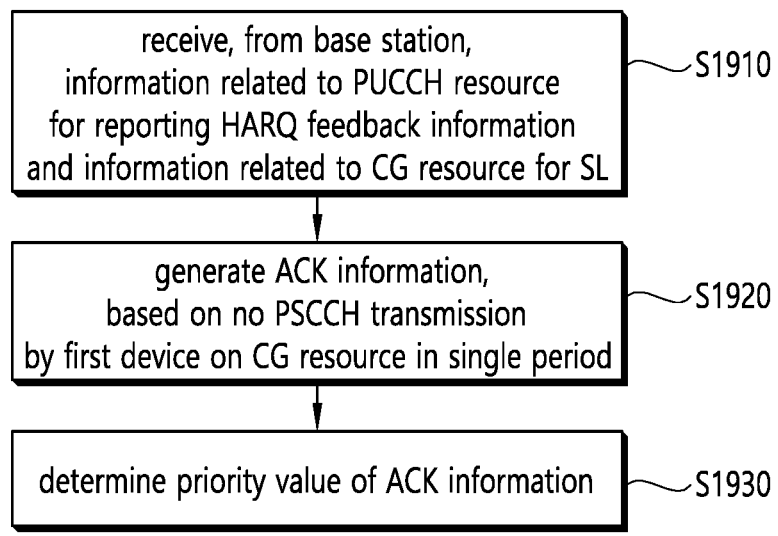
FIG. 19 shows a method for a first device to perform wireless communication, based on an embodiment of the present disclosure.

FIG. 19 shows a method for a first device to perform wireless communication, based on an embodiment of the present disclosure. The embodiment of FIG. 19 may be combined with various embodiments of the present disclosure.

Referring to FIG. 19, in step S1910, the first device may receive, from a base station, information related to a physical uplink control channel (PUCCH) resource for reporting hybrid automatic repeat request (HARQ) feedback information and information related to a configured grant (CG) resource for sidelink (SL). In step S1920, the first device may generate ACK information, based on no physical sidelink control channel (PSCCH) transmission by the first device on the CG resource in a single period. In step S1930, the first device may determine a priority value of the ACK information. For example, the priority value of the ACK information may be same as a largest priority value among at least one possible priority value related to the CG resource.

Additionally, for example, the first device may receive, from the base station, the at least one possible priority value related to the CG resource.

For example, the first device may not transmit the PSCCH on any CG resource in the single period. For example, the CG resource may include periodic resources allocated to the first device based on at least one of a downlink control information (DCI) or radio resource control (RRC) signaling. For example, a retransmission resource related to the CG resource in the single period may not be allocated to the first device by the base station based on the ACK information.

Additionally, for example, the first device may determine, based on the priority value of the ACK information, whether or not to transmit the ACK information to the base station based on the PUCCH. For example, based on the priority value of the ACK information being smaller than a priority value of SL communication, the ACK information may be transmitted to the base station based on the PUCCH. For example, based on the priority value of the ACK information being smaller than a priority value of SL communication, transmit power related to the SL communication may be reduced. For example, based on the priority value of the ACK information being larger than a priority value of SL communication, the SL communication may be performed. For example, based on the priority value of the ACK information being larger than a priority value of SL communication, transmit power for the PUCCH may be reduced.

For example, a priority index value of the PUCCH may be set to 0 for the first device, based on a SL priority threshold related to ultra reliable low latency communications (URLLC) not being configured for the first device, and the priority index value 0 may represent that transmission for the PUCCH is related to enhanced mobile broadband (eMBB).

For example, a priority index value of the PUCCH may be set to 1 for the first device, based on a SL priority threshold related to URLLC being configured for the first device, and the priority index value 1 may represent that transmission for the PUCCH is related to the URLLC.

For example, based on (i) a SL priority threshold related to URLLC being configured for the first device and (ii) a priority value of the PUCCH being smaller than the SL priority threshold, a priority index value of the PUCCH may be set to 1 for the first device, and the priority index value 1 may represent that transmission for the PUCCH is related to URLLC.

The proposed method can be applied to the device(s) described in the various embodiments of the present disclosure. First, the processor 102 of the first device 100 may control the transceiver 106 to receive, from a base station, information related to a physical uplink control channel (PUCCH) resource for reporting hybrid automatic repeat request (HARQ) feedback information and information related to a configured grant (CG) resource for sidelink (SL). In addition, the processor 102 of the first device 100 may generate ACK information, based on no physical sidelink control channel (PSCCH) transmission by the first device on the CG resource in a single period. In addition, the processor 102 of the first device 100 may determine a priority value of the ACK information. For example, the priority value of the ACK information may be same as a largest priority value among at least one possible priority value related to the CG resource.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: receive, from a base station, information related to a physical uplink control channel (PUCCH) resource for reporting hybrid automatic repeat request (HARQ) feedback information and information related to a configured grant (CG) resource for sidelink (SL); generate ACK information, based on no physical sidelink control channel (PSCCH) transmission by the first device on the CG resource in a single period; and determine a priority value of the ACK information. For example, the priority value of the ACK information may be same as a largest priority value among at least one possible priority value related to the CG resource.

Based on an embodiment of the present disclosure, an apparatus configured to control a first user equipment (UE) performing wireless communication may be provided. For example, the apparatus may comprise: one or more processors; and one or more memories operably connected to the one or more processors and storing instructions. For example, the one or more processors may execute the instructions to: receive, from a base station, information related to a physical uplink control channel (PUCCH) resource for reporting hybrid automatic repeat request (HARQ) feedback information and information related to a configured grant (CG) resource for sidelink (SL); generate ACK information, based on no physical sidelink control channel (PSCCH) transmission by the first UE on the CG resource in a single period; and determine a priority value of the ACK information. For example, the priority value of the ACK information may be same as a largest priority value among at least one possible priority value related to the CG resource.

Based on an embodiment of the present disclosure, a non-transitory computer-readable storage medium storing instructions may be provided. For example, the instructions, when executed, may cause a first device to: receive, from a base station, information related to a physical uplink control channel (PUCCH) resource for reporting hybrid automatic repeat request (HARQ) feedback information and information related to a configured grant (CG) resource for sidelink (SL); generate ACK information, based on no physical sidelink control channel (PSCCH) transmission by the first device on the CG resource in a single period; and determine a priority value of the ACK information. For example, the priority value of the ACK information may be same as a largest priority value among at least one possible priority value related to the CG resource.

Figure 20:
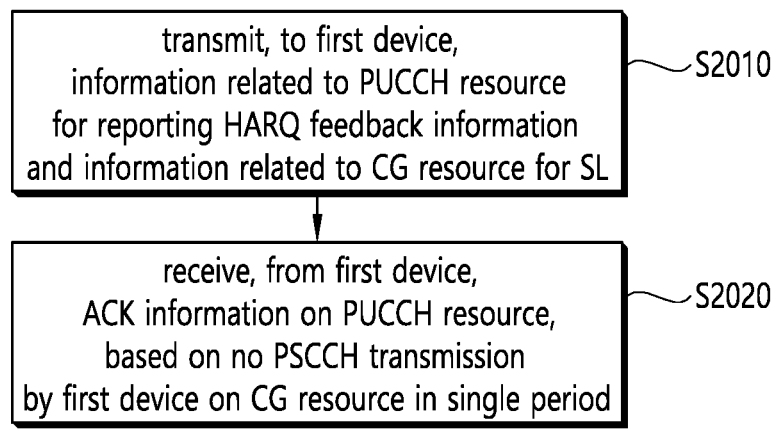
FIG. 20 shows a method for a base station to perform wireless communication, based on an embodiment of the present disclosure.

FIG. 20 shows a method for a base station to perform wireless communication, based on an embodiment of the present disclosure. The embodiment of FIG. 20 may be combined with various embodiments of the present disclosure.

Referring to FIG. 20, in step S2010, the base station may transmit, to a first device, information related to a physical uplink control channel (PUCCH) resource for reporting hybrid automatic repeat request (HARQ) feedback information and information related to a configured grant (CG) resource for sidelink (SL). In step S2020, the base station may receive, from the first device, ACK information on the PUCCH resource, based on no physical sidelink control channel (PSCCH) transmission by the first device on the CG resource in a single period. For example, a priority value of the ACK information may be same as a largest priority value among at least one possible priority value related to the CG resource.

The proposed method can be applied to the device(s) described in the various embodiments of the present disclosure. First, the processor 202 of the base station 200 may control the transceiver 206 to transmit, to a first device, information related to a physical uplink control channel (PUCCH) resource for reporting hybrid automatic repeat request (HARQ) feedback information and information related to a configured grant (CG) resource for sidelink (SL). In addition, the processor 202 of the base station 200 may control the transceiver 206 to receive, from the first device, ACK information on the PUCCH resource, based on no physical sidelink control channel (PSCCH) transmission by the first device on the CG resource in a single period. For example, a priority value of the ACK information may be same as a largest priority value among at least one possible priority value related to the CG resource.

Based on an embodiment of the present disclosure, a base station configured to perform wireless communication may be provided. For example, the base station may comprise: one or more memories storing instructions; one or more transceivers; and one or more processors connected to the one or more memories and the one or more transceivers. For example, the one or more processors may execute the instructions to: transmit, to a first device, information related to a physical uplink control channel (PUCCH) resource for reporting hybrid automatic repeat request (HARQ) feedback information and information related to a configured grant (CG) resource for sidelink (SL); and receive, from the first device, ACK information on the PUCCH resource, based on no physical sidelink control channel (PSCCH) transmission by the first device on the CG resource in a single period. For example, a priority value of the ACK information may be same as a largest priority value among at least one possible priority value related to the CG resource.

Based on an embodiment of the present disclosure, an apparatus configured to control a base station performing wireless communication may be provided. For example, the apparatus may comprise: one or more processors; and one or more memories operably connected to the one or more processors and storing instructions. For example, the one or more processors may execute the instructions to: transmit, to a first user equipment (UE), information related to a physical uplink control channel (PUCCH) resource for reporting hybrid automatic repeat request (HARQ) feedback information and information related to a configured grant (CG) resource for sidelink (SL); and receive, from the first UE, ACK information on the PUCCH resource, based on no physical sidelink control channel (PSCCH) transmission by the first UE on the CG resource in a single period. For example, a priority value of the ACK information may be same as a largest priority value among at least one possible priority value related to the CG resource.

Based on an embodiment of the present disclosure, a non-transitory computer-readable storage medium storing instructions may be provided. For example, the instructions, when executed, may cause a base station to: transmit, to a first device, information related to a physical uplink control channel (PUCCH) resource for reporting hybrid automatic repeat request (HARQ) feedback information and information related to a configured grant (CG) resource for sidelink (SL); and receive, from the first device, ACK information on the PUCCH resource, based on no physical sidelink control channel (PSCCH) transmission by the first device on the CG resource in a single period. For example, a priority value of the ACK information may be same as a largest priority value among at least one possible priority value related to the CG resource.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 21:
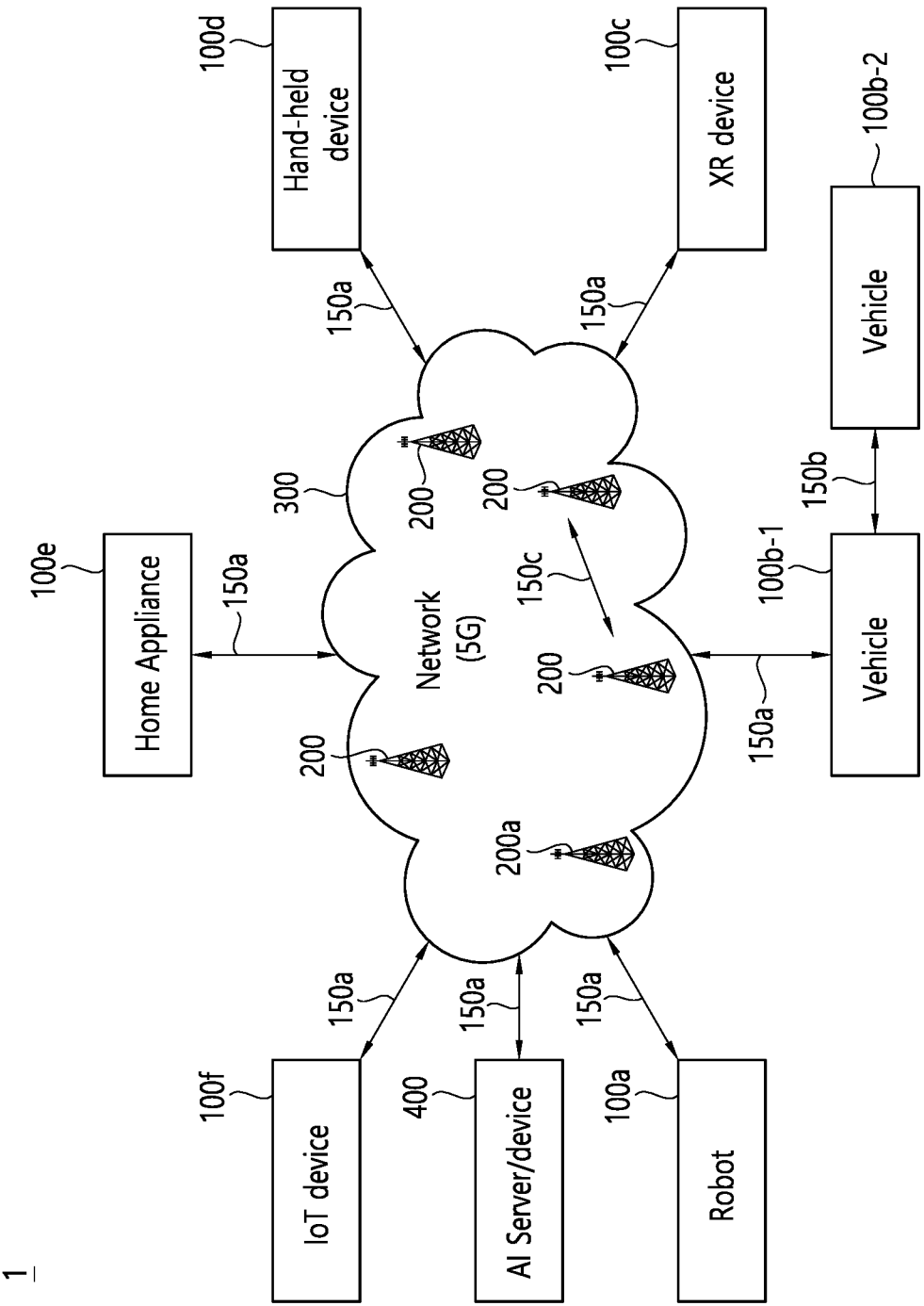
FIG. 21 shows a communication system 1, based on an embodiment of the present disclosure.

FIG. 21 shows a communication system 1, based on an embodiment of the present disclosure.

Referring to FIG. 21, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 22:
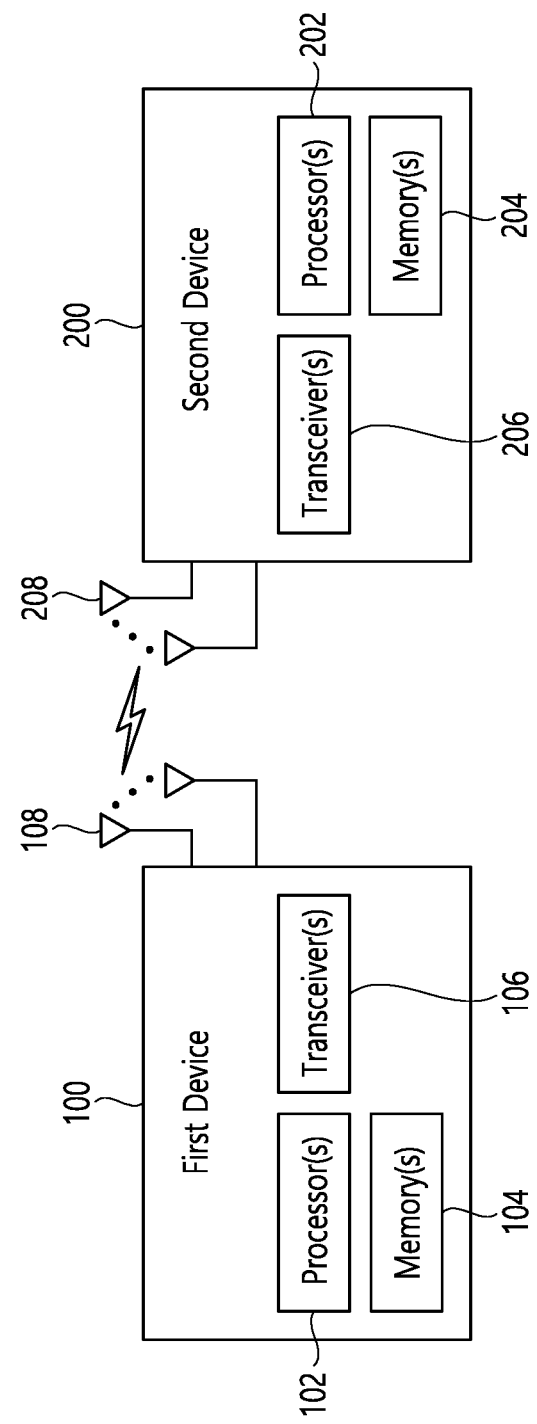
FIG. 22 shows wireless devices, based on an embodiment of the present disclosure.

FIG. 22 shows wireless devices, based on an embodiment of the present disclosure.

Referring to FIG. 22, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 21.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 23:
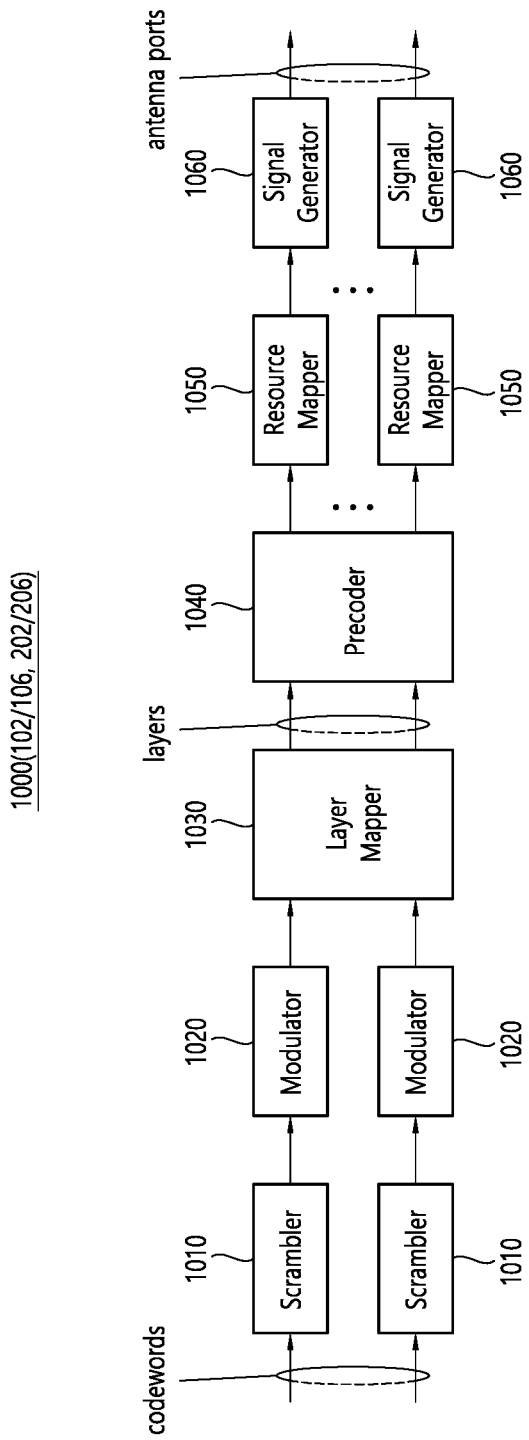
FIG. 23 shows a signal process circuit for a transmission signal, based on an embodiment of the present disclosure.

FIG. 23 shows a signal process circuit for a transmission signal, based on an embodiment of the present disclosure.

Referring to FIG. 23, a signal processing circuit 1000 may include scramblers 1010, modulators 1020, a layer mapper 1030, a precoder 1040, resource mappers 1050, and signal generators 1060. An operation/function of FIG. 23 may be performed, without being limited to, the processors 102 and 202 and/or the transceivers 106 and 206 of FIG. 22. Hardware elements of FIG. 23 may be implemented by the processors 102 and 202 and/or the transceivers 106 and 206 of FIG. 22. For example, blocks 1010 to 1060 may be implemented by the processors 102 and 202 of FIG. 22. Alternatively, the blocks 1010 to 1050 may be implemented by the processors 102 and 202 of FIG. 22 and the block 1060 may be implemented by the transceivers 106 and 206 of FIG. 22.

Codewords may be converted into radio signals via the signal processing circuit 1000 of FIG. 23. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 23. For example, the wireless devices (e.g., 100 and 200 of FIG. 22) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 24:
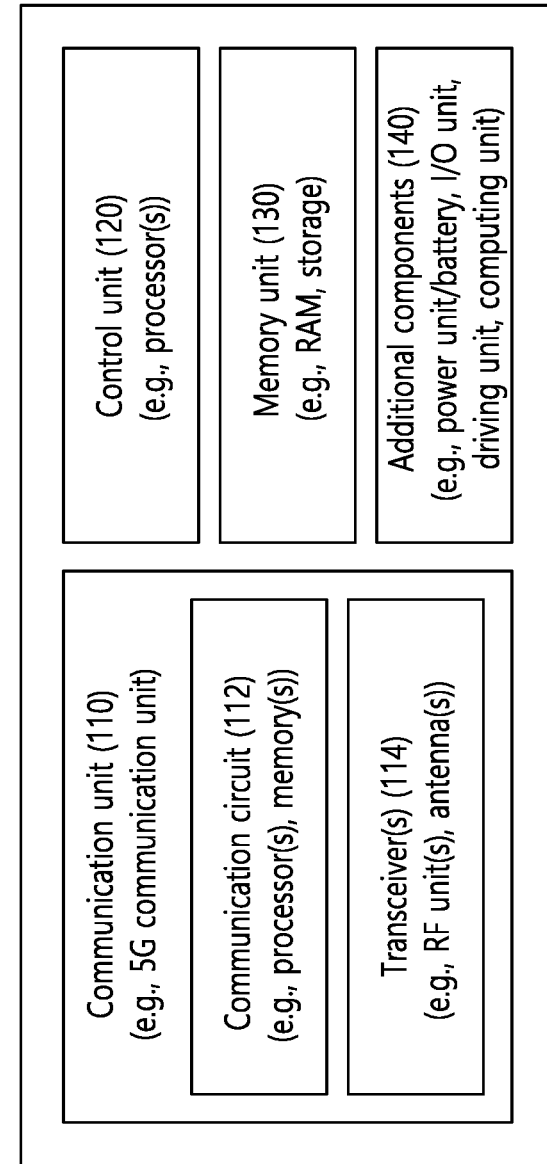
FIG. 24 shows another example of a wireless device, based on an embodiment of the present disclosure.

FIG. 24 shows another example of a wireless device, based on an embodiment of the present disclosure. The wireless device may be implemented in various forms according to a use-case/service (refer to FIG. 21).

Referring to FIG. 24, wireless devices 100 and 200 may correspond to the wireless devices 100 and 200 of FIG. 22 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 22. For example, the transceiver(s) 114 may include the one or more transceivers 106 and 206 and/or the one or more antennas 108 and 208 of FIG. 22. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 21), the vehicles (100b-1 and 100b-2 of FIG. 21), the XR device (100c of FIG. 21), the hand-held device (100d of FIG. 21), the home appliance (100e of FIG. 21), the IoT device (100f of FIG. 21), a digital broadcast terminal, a hologram device, a public safety device, an MTC device, a medicine device, a fintech device (or a finance device), a security device, a climate/environment device, the AI server/device (400 of FIG. 21), the BSs (200 of FIG. 21), a network node, etc. The wireless device may be used in a mobile or fixed place according to a use-example/service.

In FIG. 24, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 24 will be described in detail with reference to the drawings.

Figure 25:
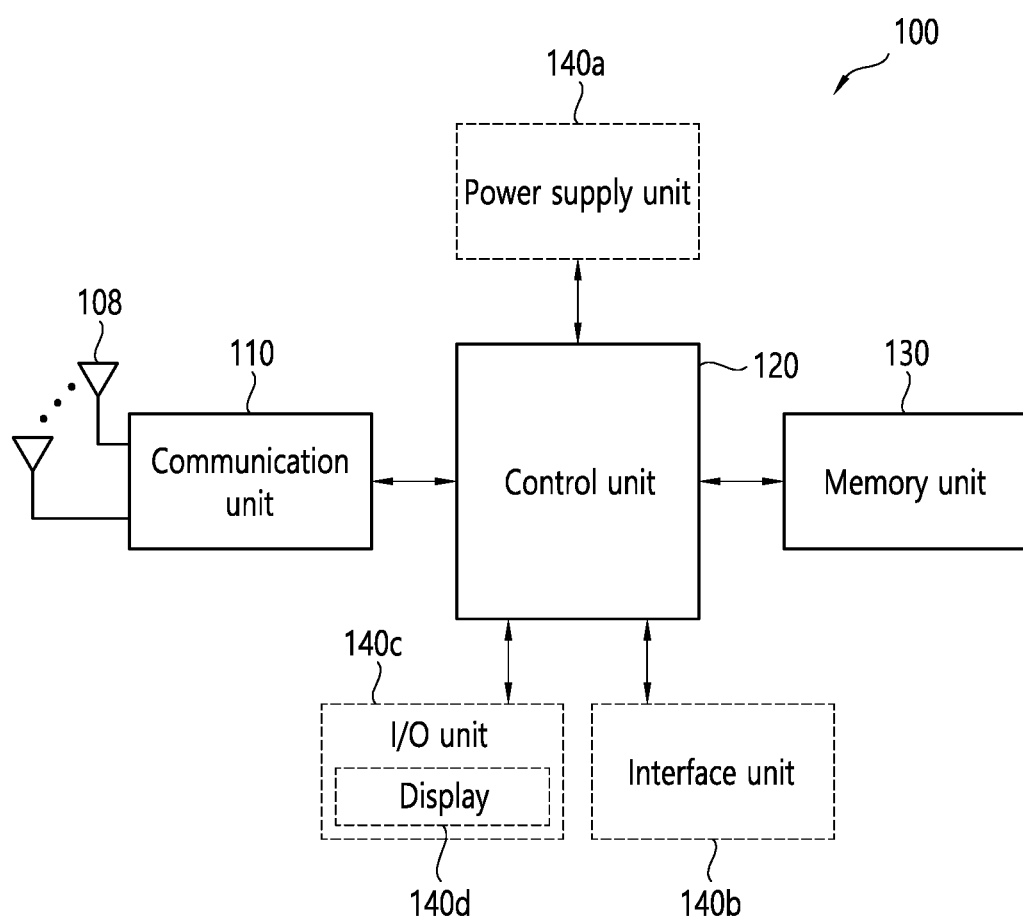
FIG. 25 shows a hand-held device, based on an embodiment of the present disclosure.

FIG. 25 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 25, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 24, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

FIG. 26 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 26, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 24, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
  receiving, from a base station, information regarding a physical uplink control channel (PUCCH) and information regarding a configured grant for sidelink (SL);
  generating hybrid automatic repeat request (HARQ) feedback information including ACK information, based on the first device not transmitting a physical sidelink control channel (PSCCH) with sidelink control information (SCI) in any of resources provided by the configured grant in a single period; and
  determining a priority value of the ACK information,
  wherein the priority value of the ACK information, generated based on the first device not transmitting the PSCCH with the SCI in any of resources provided by the configured grant in the single period, is same as a largest priority value among at least one possible priority value for the configured grant,
  wherein, based on the priority value of the ACK information being larger than a priority value of a SL communication, the SL communication is performed, and
  wherein based on a SL priority threshold for uplink (UL) related with an ultra-reliable and low-latency communications (URLLC) being configured for the first device, a priority index value of a PUCCH is set to 1 for the first device, and based on the SL priority threshold for the UL related with the URLLC being smaller than the priority value of the SL communication, the PUCCH of which the priority index value is set to 1 is transmitted.

2. The method of claim 1, further comprising:
  receiving, from the base station, the at least one possible priority value for the configured grant.

3. The method of claim 1, wherein the resources provided by the configured grant includes periodic resources allocated to the first device based on at least one of a downlink control information (DCI) or radio resource control (RRC) signaling.

4. The method of claim 1, wherein a retransmission resource, related with the resources in the single period, is not allocated to the first device by the base station based on the ACK information.

5. The method of claim 1, further comprising:
determining, based on the priority value of the ACK information, whether or not to transmit the ACK information to the base station based on the PUCCH.

6. The method of claim 5, wherein, based on the priority value of the ACK information being smaller than the priority value of the SL communication, the ACK information is transmitted to the base station based on the PUCCH.

7. The method of claim 5, wherein, based on the priority value of the ACK information being smaller than the priority value of the SL communication, transmit power for the SL communication is reduced.

8. The method of claim 5, wherein, based on the priority value of the ACK information being larger than the priority value of the SL communication, transmit power for the PUCCH is reduced.

9. The method of claim 1, wherein, based on the SL priority threshold for the UL related with the URLLC not being configured for the first device, the priority index value of the PUCCH is set to 0 for the first device, and the PUCCH of which the priority index value set to 0 is related with enhanced mobile broadband (eMBB).

10. The method of claim 1, wherein, based on the SL priority threshold for the UL related with the URLLC being configured for the first device, the priority index value of the PUCCH is set to 1 for the first device, and based on the priority value of the SL communication being smaller than the SL priority threshold for the UL related with the URLLC, the PUCCH of which the priority index value is set to 1 is not transmitted.

11. The method of claim 1, wherein transmission of the HARQ feedback information is performed within a time after k slot with reference to a physical sidelink feedback channel (PSFCH) reception occasion.

12. A first device adapted to perform wireless communication, the first device comprising:
one or more memories storing instructions;
one or more transceivers; and
one or more processors connected to the one or more memories and the one or more transceivers, wherein the one or more processors execute the instructions to:
control the one or more transceivers to receive, from a base station, information regarding a physical uplink control channel (PUCCH) for reporting hybrid automatic repeat request (HARQ) feedback information and information regarding a configured grant for sidelink (SL);
generate ACK information, based on the first device not transmitting a physical sidelink control channel (PSCCH) with sidelink control information (SCI) in any of resources provided by the configured grant in a single period; and
determine a priority value of the ACK information,
wherein the priority value of the ACK information, generated based on the first device not transmitting the PSCCH with the SCI in any of resources provided by the configured grant in the single period, is same as a largest priority value among at least one possible priority value for the configured grant,
wherein, based on the priority value of the ACK information being larger than a priority value of a SL communication, the SL communication is performed, and
wherein based on a SL priority threshold for uplink (UL) related with an ultra-reliable and low-latency communications (URLLC) being configured for the first device, a priority index value of a PUCCH is set to 1 for the first device, and based on the SL priority threshold for the UL related with the URLLC being smaller than the priority value of the SL communication, the PUCCH of which the priority index value is set to 1 is transmitted.

13. The first device of claim 12, wherein the one or more processors further execute the instructions to: receive, from the base station, the at least one possible priority value for the configured grant.

14. The first device of claim 12, wherein the resources provided by the configured grant includes periodic resources allocated to the first device based on at least one of a downlink control information (DCI) or radio resource control (RRC) signaling.

15. The first device of claim 12, wherein a retransmission resource, related with the resources in the single period, is not allocated to the first device by the base station based on the ACK information.

16. The first device of claim 12, wherein the one or more processors further execute the instructions to: determine, based on the priority value of the ACK information, whether or not to transmit the ACK information to the base station based on the PUCCH.

17. The first device of claim 12, wherein transmission of the HARQ feedback information is performed within a time after k slot with reference to a physical sidelink feedback channel (PSFCH) reception occasion.

18. A first device performing wireless communication and comprising:
one or more processors; and
one or more memories operably connected to the one or more processors and storing instructions, wherein the one or more processors execute the instructions to:
receive, from a base station, information regarding a physical uplink control channel (PUCCH) for reporting hybrid automatic repeat request (HARQ) feedback information and information regarding a configured grant for sidelink (SL);
generate ACK information, based on the first device not transmitting a physical sidelink control channel (PSCCH) with sidelink control information (SCI) in any of resources provided by the configured grant in a single period; and
determine a priority value of the ACK information,
wherein the priority value of the ACK information, generated based on the first device not transmitting the PSCCH with the SCI in any of resources provided by the configured grant in the single period, is same as a largest priority value among at least one possible priority value for the configured grant,
wherein, based on the priority value of the ACK information being larger than a priority value of a SL communication, the SL communication is performed, and
wherein based on a SL priority threshold for uplink (UL) related with an ultra-reliable and low-latency communications (URLLC) being configured for the first device, a priority index value of a PUCCH is set to 1 for the first device, and based on the SL priority threshold for the UL related with the URLLC being smaller than the priority value of the SL communication, the PUCCH of which the priority index value is set to 1 is transmitted.

19. The first device of claim 18, wherein transmission of the HARQ feedback information is performed within a time after k slot with reference to a physical sidelink feedback channel (PSFCH) reception occasion.

\* \* \* \* \*